US012562483B2

(12) United States Patent
Kwon et al.

(10) Patent No.: US 12,562,483 B2
(45) Date of Patent: Feb. 24, 2026

(54) ANTENNA AND ELECTRONIC DEVICE COMPRISING SAME

(71) Applicant: SAMSUNG ELECTRONICS CO., LTD., Suwon-si (KR)

(72) Inventors: Soonheung Kwon, Suwon-si (KR); Hosaeng Kim, Suwon-si (KR); Ahyun Shin, Suwon-si (KR); Sumin Yun, Suwon-si (KR); Hyungjoo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 114 days.

(21) Appl. No.: 18/514,723

(22) Filed: Nov. 20, 2023

(65) Prior Publication Data

US 2024/0106125 A1 Mar. 28, 2024

Related U.S. Application Data

(63) Continuation of application No. PCT/KR2022/004853, filed on Apr. 5, 2022.

(30) Foreign Application Priority Data

May 20, 2021 (KR) ........................ 10-2021-0064740

(51) Int. Cl.
*H01Q 9/04* (2006.01)
*H01Q 1/24* (2006.01)
(Continued)

(52) U.S. Cl.
CPC ........... *H01Q 9/0407* (2013.01); *H01Q 1/243* (2013.01); *H01Q 1/48* (2013.01); *H01Q 5/10* (2015.01)

(58) Field of Classification Search
CPC ........ H01Q 9/0407; H01Q 1/243; H01Q 1/48; H01Q 5/10; H01Q 9/0428; H01Q 21/065; H01Q 9/0414
See application file for complete search history.

(56) References Cited

U.S. PATENT DOCUMENTS 10,283,832 B1 5/2019 Chayat et al.
10,965,031 B2 3/2021 Shin et al.
(Continued)

FOREIGN PATENT DOCUMENTS

CN 108281776 B 3/2021
JP 2021-507642 A 2/2021
(Continued)

OTHER PUBLICATIONS

International Search Report (PCT/ISA/210) issued by the International Searching Authority on Jul. 13, 2022 in corresponding International Application No. PCT/KR2022/004853.
(Continued)

*Primary Examiner* — Hai V Tran
(74) *Attorney, Agent, or Firm* — Sughrue Mion, PLLC

(57) ABSTRACT

An electronic device includes a substrate including a ground layer; and a plurality of antenna structures space apart from each other on the substrate. Each of the plurality of antenna structures may include, on the substrate: a rectangular first conductive patch including a pair of cutting portions in which diagonally opposite corners are cut; a rectangular second conductive patch disposed so as to be coupled to the first conductive patch; and a plurality of conductive pads which are disposed along the periphery of the second conductive patch so as to be spaced apart from each other at a specified interval, and are electrically connected to the ground layer.

20 Claims, 27 Drawing Sheets

(51) Int. Cl.
*H01Q 1/48* (2006.01)
*H01Q 5/10* (2015.01)

(56) References Cited

U.S. PATENT DOCUMENTS

| | | | | |
|---|---|---|---|---|
| 2011/0242863 | A1* | 10/2011 | Park | H01Q 5/40 363/126 |
| 2019/0165472 | A1* | 5/2019 | Yun | H01Q 21/24 |
| 2020/0052405 | A1* | 2/2020 | Park | H02J 50/20 |
| 2020/0106158 | A1 | 4/2020 | Gomez Angulo et al. | |
| 2020/0106181 | A1* | 4/2020 | Avser | H01Q 1/243 |
| 2020/0227829 | A1* | 7/2020 | Jouanlanne | H01Q 9/0421 |
| 2020/0295454 | A1* | 9/2020 | Yun | H01Q 1/2283 |
| 2020/0358203 | A1* | 11/2020 | Park | H01Q 1/243 |
| 2021/0005968 | A1 | 1/2021 | Park et al. | |
| 2021/0044028 | A1 | 2/2021 | Lee et al. | |
| 2023/0178901 | A1* | 6/2023 | Kim | H01Q 21/24 343/702 |

FOREIGN PATENT DOCUMENTS

| | | | |
|---|---|---|---|
| KR | 10-1998-0012712 | B1 | 6/1999 |
| KR | 10-2011-0109495 | A | 10/2011 |
| KR | 10-1672743 | B1 | 11/2016 |
| KR | 10-2019-0062064 | A | 6/2019 |
| KR | 10-2020-0036736 | A | 4/2020 |
| KR | 10-2020-0109900 | A | 9/2020 |
| KR | 10-2162799 | B1 | 10/2020 |
| KR | 10-2020-0130028 | A | 11/2020 |
| KR | 10-2021-0017439 | A | 2/2021 |

OTHER PUBLICATIONS

Written Opinion (PCT/ISA/237) issued by the International Searching Authority on Jul. 13, 2022 in corresponding International Application No. PCT/KR2022/004853.

* cited by examiner

ANTENNA AND ELECTRONIC DEVICE COMPRISING SAME

CROSS-REFERENCE TO RELATED APPLICATIONS

This application is a continuation of International Application No. PCT/KR2022/004853, filed on Apr. 5, 2022, in the Korean Intellectual Property Receiving Office, which is based on and claims priority to Korean Patent Application No. 10-2021-0064740, filed on May 20, 2021, in the Korean Intellectual Property Office, the disclosures of which are incorporated by reference herein in their entireties.

BACKGROUND

1. Field

The disclosure relates to an antenna and an electronic device including the same.

2. Description of Related Art

With the advancement of wireless communication technology, electronic devices are increasingly used in daily life, and the level of user demands is increasing. Various types of wireless communication technologies can be used to meet the increased level of user demands. For example, wireless communication technologies may include at least one of ultra wide band (UWB) communication, wireless fidelity (Wi-Fi) communication, long term evolution (LTE) communication, 5G (or new radio (NR)) communication, or Bluetooth communication. For instance, an electronic device supporting ultra-wideband (UWB) communication may use a UWB antenna including at least three antenna structures to measure the position (distance or angle of arrival (AoA)) of at least one external electronic device.

An electronic device may include an antenna module (e.g., antenna). This antenna module may include a legacy antenna module operating in frequency bands of approximately 600 MHz to 6000 MHz, a 5G antenna module operating in frequency bands of approximately 3 GHz to 100 GHz, or an antenna module for measuring the position of a nearby external electronic device. For example, the antenna module for measuring the position of a nearby external electronic device may include an ultra wide band (UWB) antenna module including at least three antenna structures operating in a frequency band ranging from about 6 GHz to 8.5 GHz. This UWB antenna module can be operated in dual bands through a first conductive patch and a second conductive patch arranged in a stacked manner on a dielectric substrate (e.g., flexible printed circuit board (FPCB)). For instance, the first conductive patch can be operated in a first frequency band by being electrically connected through the feeder to the wireless communication circuit of the electronic device, and the second conductive patch can be operated in a second frequency band different from the first frequency band through coupled feeding with the first conductive patch.

In such a UWB antenna module, the patch size can be reduced through at least one slit formed in the diagonal direction of the conductive patches, and circular polarization can be implemented through a cut portion formed at a specific corner. For example, the frequency band and/or circular polarization direction of the second conductive patch may be determined through at least one conductive pad formed below the second conductive patch and electrically connected to the ground of the substrate.

However, the stacked structure with a first conductive patch, a second conductive patch, one or more conductive pads, and a ground layer stacked on different layers of the substrate can increase the thickness of the UWB antenna module.

SUMMARY

Provided are an antenna that can measure the position of an external electronic device with a relatively simple stacked structure, and an electronic device including the same.

Further, provided are an antenna that is implemented to have excellent radiation performance by having two conductive patches producing orthogonal circular polarizations, and an electronic device including the same.

Additional aspects will be set forth in part in the description which follows and, in part, will be apparent from the description, or may be learned by practice of the presented embodiments.

According to an aspect of the disclosure, an electronic device includes: a housing; an antenna module disposed in an internal space of the housing, the antenna module including: a substrate including a first substrate surface, a second substrate surface facing in a direction opposite to the first substrate surface, and a ground layer between the first substrate surface and the second substrate surface; and a plurality of antenna structures spaced apart from each other on the substrate, each of the plurality of antenna structures including: a first conductive patch between the ground layer and the first substrate surface, having a rectangular shape, and including a first cut portion and a second cut portion at diagonally opposite corners; a second conductive patch between the first conductive patch and the ground layer, having a rectangular shape, and coupled to the first conductive patch; and a plurality of conductive pads spaced apart from each other along an edge of the second conductive patch, and electrically connected to the ground layer; and a wireless communication circuit provided in the internal space and electrically connected to the first conductive patch, wherein the wireless communication circuit is configured to transmit or receive a radio signal of a first frequency band through the first conductive patch, and receive a radio signal of a second frequency band, different from the first frequency band, through the second conductive patch.

The first conductive patch may further include a first side, a second side extended perpendicularly from the first side, a third side extended perpendicularly from the second side, and a fourth side extended perpendicularly from the third side and connected to the first side, and the first cut portion is at a first corner where the first side and the second side meet, and the second cut portion is at a second corner where the third side and the fourth side meet.

The second conductive patch may include a fifth side corresponding to the first side, a sixth side extended perpendicularly from the fifth side and corresponding to the second side, a seventh side extended perpendicularly from the sixth side and corresponding to the third side, and an eighth side extended perpendicularly from the seventh side, connected to the fifth side, and corresponding to the fourth side, and the second conductive patch is overlaps the first conductive patch when the first substrate surface is viewed from above.

The second conductive patch may have at least one of a substantially same size or a substantially same shape as the first conductive patch.

The first conductive patch may further include a feeder extending from the fourth side or at a position adjacent to the fourth side, and electrically connected to the wireless communication circuit.

The first conductive patch may further include a first slit extending from the first cut portion toward a center of the first conductive patch, a second slit extending from the second cut portion toward the center of the first conductive patch, a third slit extending from a corner where the second side and the third side meet toward the center of the first conductive patch, and a fourth slit extending from a corner where the first side and the fourth side meet toward the center of the first conductive patch, each of the first slit, the second slit, the third slit, and the fourth slit has a first length and a first width, and the first frequency band is determined according to at least one of the first length or the first width.

The second conductive patch may further include a fifth slit extending from a corner where the fifth side and the sixth side meet toward a center of the second conductive patch, a sixth slit extending from a corner where the seventh side and the eighth side meet toward the center of the second conductive patch, a seventh slit extending from a corner where the second side and the third side meet toward the center of the second conductive patch, and an eighth slit extending from a corner where the fifth side and the eighth side meet toward the center of the second conductive patch, each of the fifth slit, the sixth slit, the seventh slit, and the eighth slit has a second length and a second width, and the second frequency band is determined according to at least one of the second length or the second width.

The first slit, the second slit, the third slit, and the fourth slit may respectively overlap the fifth slit, the sixth slit, the seventh slit, and the eighth slit when the first substrate surface is viewed from above.

The first length may be substantially equal to the second length, or the first width is substantially equal to the second width.

The plurality of conductive pads may include: a first conductive pad electrically coupled with and separated by a first gap from at least a portion of the fifth side and at least a portion of the sixth side, a second conductive pad electrically coupled with and separated by the first gap from at least a portion of the seventh side and at least a portion of the eighth side, a third conductive pad electrically coupled with and separated by a second gap from at least a portion of the sixth side and at least a portion of the seventh side, and a fourth conductive pad electrically coupled with and separated by the second gap from at least a portion of the fifth side and at least a portion of the eighth side.

A size of the first gap may be less than a size of the second gap.

The first conductive pad and the second conductive pad may be disposed in at least a portion of the fifth slit and the sixth slit, respectively, and the third conductive pad and the fourth conductive pad are disposed in at least a portion of the seventh slit and the eighth slit, respectively.

A size of the first gap may be substantially the same as a size of the second gap, each of the first conductive pad and the second conductive pad may have a third width, and each of the third conductive pad and the fourth conductive pad may have a fourth width that is greater than the third width.

The first conductive patch may have a first circular polarization rotating in a first direction, and the second conductive patch may have a second circular polarization rotating in a second direction opposite to the first direction.

The wireless communication circuit may be further configured to receive a radio signal of a frequency band ranging from 3.735 GHz to 10.2 GHz through at least one of the first conductive patch or the second conductive patch.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
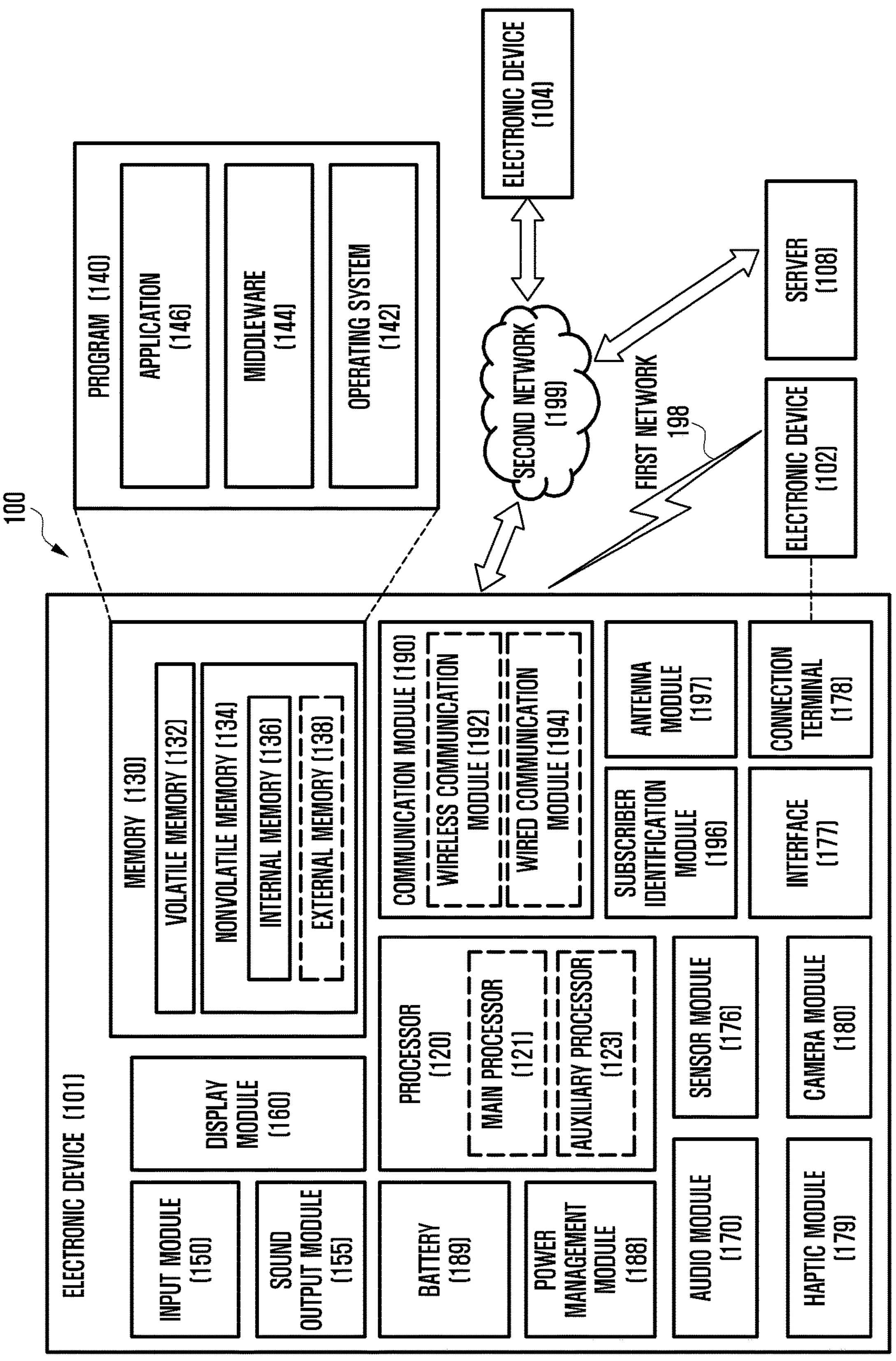
FIG. 1 is a block diagram of an electronic device in a network environment, according to one or more embodiments.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms. It is to be understood that singular forms include plural referents unless the context clearly dictates otherwise. The terms including technical or scientific terms used in the disclosure may have the same meanings as generally understood by those skilled in the art.

FIG. 1 illustrates an electronic device in a network environment, according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connection terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., through a wire) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., though a wire) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
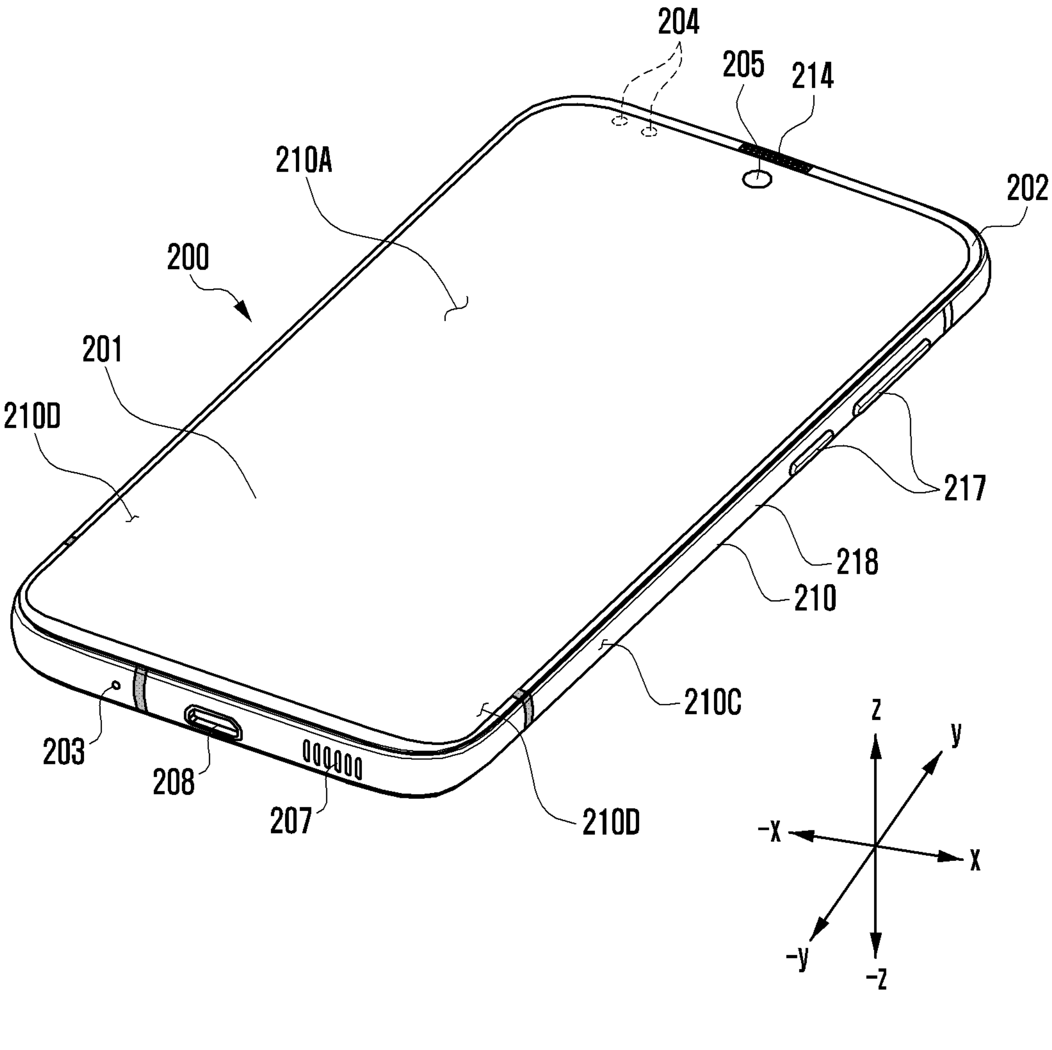
FIG. 2A is a perspective view of an electronic device, according to embodiments of the disclosure.
Figure 2B:
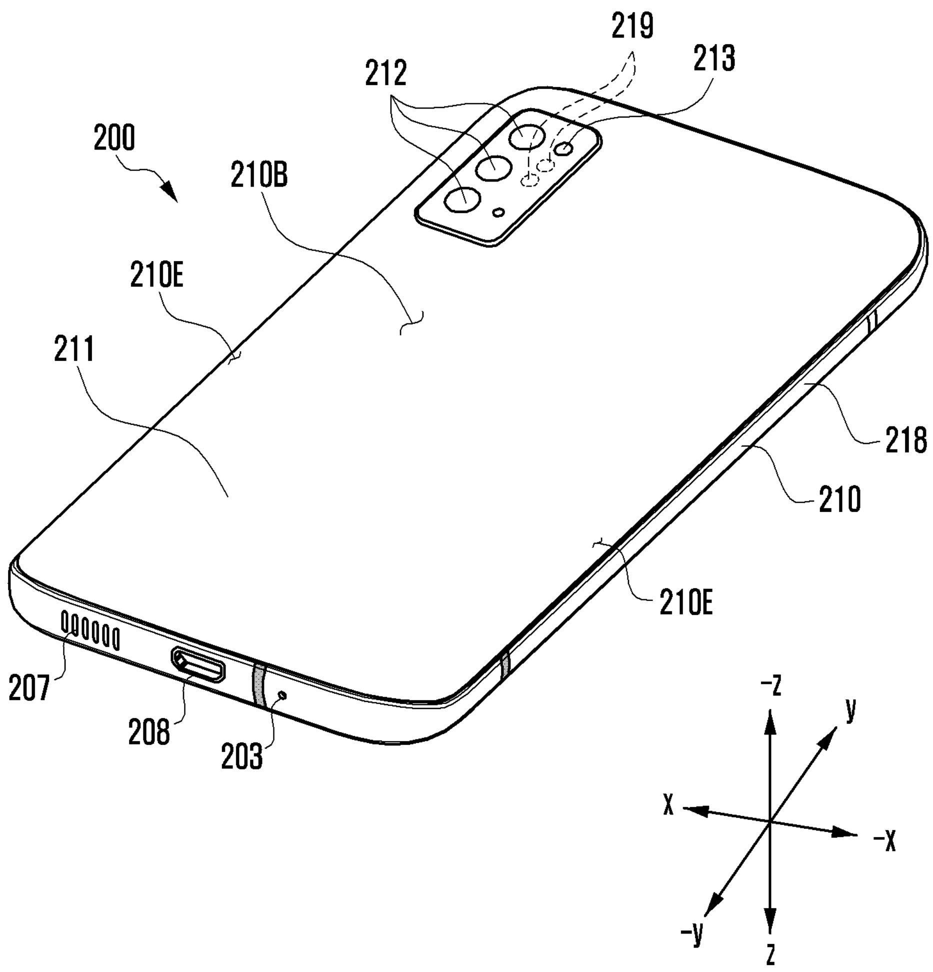
FIG. 2B is a rear perspective view of an electronic device, according to one or more embodiments of the disclosure.

FIG. 2A is a perspective view illustrating a front surface of a mobile electronic device, according to an embodiment of the disclosure. FIG. 2B is a perspective view illustrating a rear surface of the electronic device of FIG. 2A, according to an embodiment of the disclosure.

An electronic device 200 of FIG. 2A and FIG. 2B may be at least partially similar to the electronic device 101 of FIG. 1 or may further include other embodiments of an electronic device.

Referring to FIGS. 2A and 2B, according to an embodiment, an electronic device 200 may include a housing 210 that includes a first surface (or front surface) 210A, a second surface (or rear surface) 210B, and a lateral surface 210C that surrounds a space between the first surface 210A and the second surface 210B. According to an embodiment, the housing 210 may refer, for example, to a structure that forms a part of the first surface 210A, the second surface 210B, and the lateral surface 210C. According to an embodiment, the first surface 210A may be formed of a front plate 202 (e.g., a glass plate or polymer plate coated with a variety of coating layers) at least a part of which is substantially transparent. The second surface 210B may be formed of a rear plate 211 which is substantially opaque. The rear plate 211 may include, for example, coated or colored glass, ceramic, polymer, metal (e.g., aluminum, stainless steel (STS), or magnesium), or any combination thereof. The lateral surface 210C may be formed of a lateral bezel structure (or "lateral member") 218 which is combined with the front plate 202 and the rear plate 211 and includes a metal and/or polymer. The rear plate 211 and the lateral bezel structure 218 may be integrally formed and may be of the same material (e.g., a metallic material such as aluminum).

In the shown embodiment, the front plate 202 may include two first regions 210D disposed at long edges thereof, respectively, and bent and extended seamlessly from the first surface 210A toward the rear plate 211. In the shown embodiment, the rear plate 211 may include two second regions 210E disposed at long edges thereof, respectively, and bent and extended seamlessly from the second surface 210B toward the front plate 202 (refer to FIG. 2B). In various embodiments, the front plate 202 (or the rear plate 211) may include only one of the first regions 210D (or of the second regions 210E). In various embodiments, the first regions 210D or the second regions 210E may be omitted in part. In various embodiments, when viewed from a lateral side of the electronic device 200, the lateral bezel structure 218 may have a first thickness (or width) on a lateral side where one of the first regions 210D or one of the second regions 210E is not included, and may have a second thickness, being less than the first thickness, on another lateral side where one of the first regions 210D or one of the second regions 210E is included.

According to an embodiment, the electronic device 200 may include at least one of a display 201, audio modules 203, 207 and 214, sensor modules 204, 216 and 219, camera modules 205, 212 and 213, key input devices 217, a light emitting device 206, and connector holes 208 and 209. In various embodiments, the electronic device 200 may omit at least one (e.g., the key input devices 217 or the light emitting device 206) of the above components, or may further include other components.

The display 201 may be exposed through a substantial portion of the front plate 202, for example. In various embodiments, at least a part of the display 201 may be exposed through the front plate 202 that forms the first surface 210A and the first regions 210D. In various embodiments, outlines (i.e., edges and corners) of the display 201 may have substantially the same form as those of the front plate 202. In an embodiment, the spacing between the outline of the display 201 and the outline of the front plate 202 may be substantially unchanged in order to enlarge the exposed area of the display 201.

The audio modules 203, 207 and 214 may correspond to a microphone hole (e.g., the audio module 203) and speaker holes (e.g., the audio modules 207 and 214). The microphone hole may contain a microphone disposed therein for acquiring external sounds and, in a case, contain a plurality of microphones to sense a sound direction. The speaker holes may be classified into an external speaker hole and a call receiver hole. In various embodiments, the microphone hole and the speaker holes may be implemented as a single hole, or a speaker (e.g., a piezo speaker) may be provided without the speaker holes.

The sensor modules 204, 216 and 219 may generate electrical signals or data corresponding to an internal operating state of the electronic device 200 or to an external environmental condition. The sensor modules 204, 216 and 219 may include a first sensor module (e.g., the sensor module 204) (e.g., a proximity sensor) and/or a second sensor module (e.g., a fingerprint sensor) disposed on the first surface 210A of the housing 210, and/or a third sensor module (e.g., the sensor module 219) (e.g., a heart rate monitor (HRM) sensor) and/or a fourth sensor module (e.g., the sensor module 216) (e.g., a fingerprint sensor) disposed on the second surface 210B of the housing 210. The fingerprint sensor may be disposed on the second surface 210B as well as the first surface 210A (e.g., the display 201) of the housing 210. The electronic device 200 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 205, 212 and 213 may include a first camera device (e.g., the camera module 205) disposed on the first surface 210A of the electronic device 200, and a second camera device (e.g., the camera module 212) and/or a flash (e.g., the camera module 213) disposed on the second surface 210B. The camera module 205 or the camera module 212 may include one or more lenses, an image sensor, and/or an image signal processor. The flash may include, for example, a light emitting diode or a xenon lamp. In various embodiments, two or more lenses (infrared cameras, wide angle and telephoto lenses) and image sensors may be disposed on one side of the electronic device 200.

The key input devices 217 may be disposed on the lateral surface 210C of the housing 210. In an embodiment, the electronic device 200 may not include some or all of the key input devices 217 described above, and the key input devices 217 which are not included may be implemented in another form such as a soft key on the display 201. In various embodiments, the key input devices 217 may include the sensor module 216 disposed on the second surface 210B of the housing 210.

The light emitting device may be disposed on the first surface 210A of the housing 210, for example. For example, the light emitting device 206 may provide status information of the electronic device 200 in an optical form. In various embodiments, the light emitting device 206 may provide a light source associated with the operation of the camera module 205. The light emitting device 206 may include, for example, a light emitting diode (LED), an infrared (IR) LED, or a xenon lamp.

The connector holes 208 and 209 may include a first connector hole (e.g., the connector hole 208) adapted for a connector (e.g., a universal serial bus (USB) connector) for transmitting and receiving power and/or data to and from an external electronic device, and/or a second connector hole (e.g., the connector hole 209) adapted for a connector (e.g., an earphone jack) for transmitting and receiving an audio signal to and from an external electronic device.

The camera module 205 among the camera modules 205 and 212, the sensor module 204 among the sensor modules 204 and 219, or the indicator may be disposed to be exposed through the display 201. For example, the camera module 205, sensor module 204 or indicator may be arranged so as to come into contact with the external environment through an opening or transmissive region perforated from the internal space of the electronic device 200 up to the front plate 202 of the display 201. According to an embodiment, the region where the display 201 and the camera module 205 face each other may be formed as a transmissive region with a specific transmittance as part of the content display area. According to an embodiment, the transmissive region may be formed to have a transmittance ranging from about 5% to about 20%. This transmissive region may include a region overlapping with the effective region (e.g., field-of-view region) of the camera module 205 through which light passes to form an image with the image sensor. For example, the transmissive region of the display 201 may include a region with a lower pixel density than that of the surrounding regions. For example, the transmissive region may replace the opening. For instance, the camera module 205 may include an under display camera (UDC). In another embodiment, some sensor modules 204 may be arranged in the internal space of the electronic device to perform their functions without being visually exposed through the front plate 202. For example, in this case, the region of the display 201 facing the sensor module may not need a perforated opening.

Figure 3A:
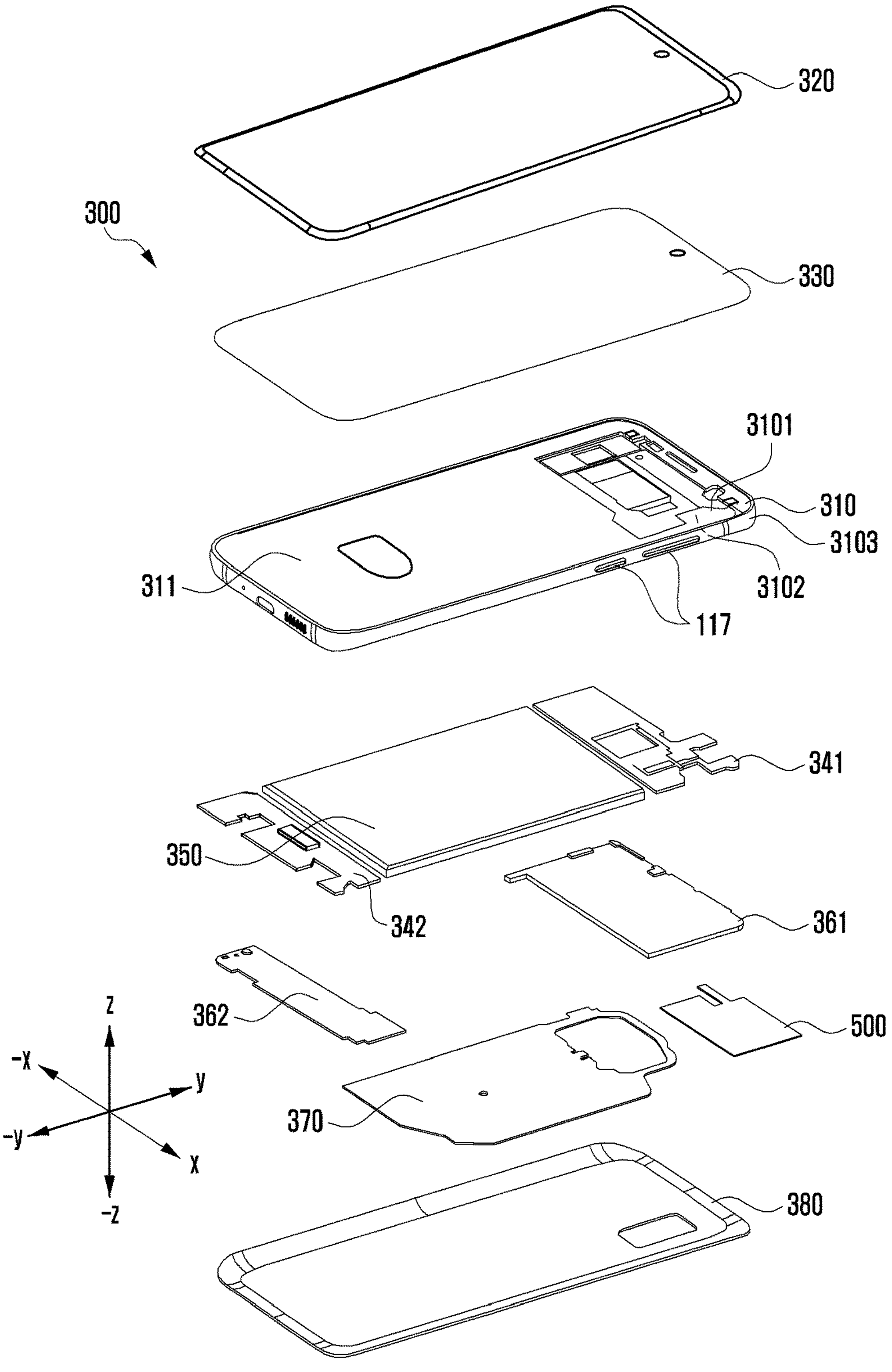
FIG. 3A is an exploded perspective view of an electronic device seen from the front, according to one or more embodiments of the disclosure.
Figure 3B:
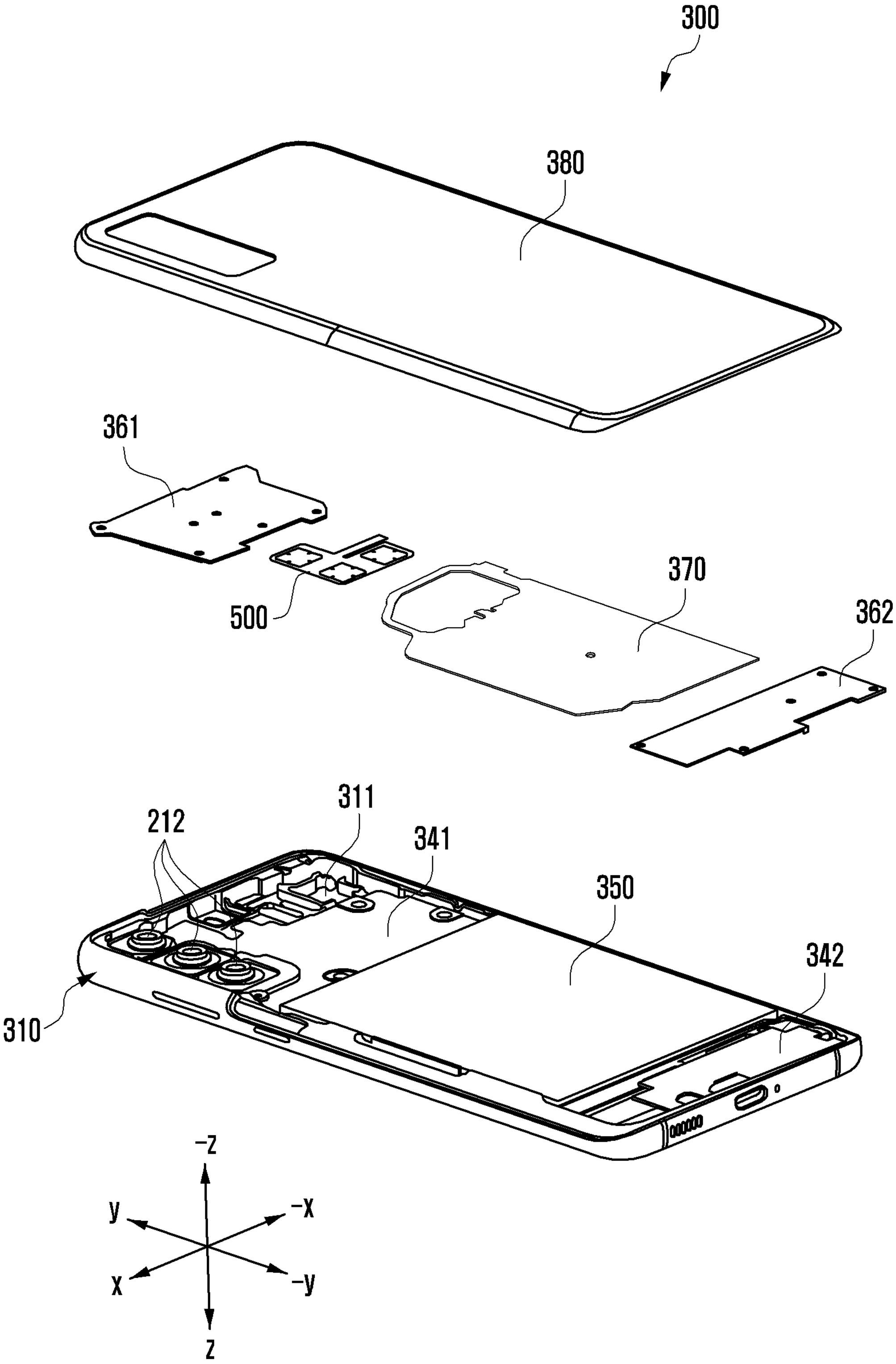
FIG. 3B is a partial exploded perspective view of an electronic device seen from the rear, according to one or more embodiments of the disclosure.

FIG. 3A is an exploded perspective view of an electronic device seen from the front, according to one or more embodiments of the disclosure. FIG. 3B is a partial exploded perspective view of the electronic device seen from the rear, according to one or more embodiments of the disclosure.

The electronic device 300 of FIGS. 3A and 3B is at least partially similar to the electronic device 101 of FIG. 1 and/or the electronic device 200 of FIGS. 2A and 2B, or may include other embodiments of an electronic device.

With reference to FIG. 3A and FIG. 3B, the electronic device 300 (e.g., electronic device 101 in FIG. 1 or electronic device 200 in FIGS. 2A and 2B) may include a lateral member 310 (e.g., lateral bezel structure 218 in FIG. 2A), a support member 311 (e.g., bracket or support structure), a front cover 320 (e.g., front plate 202 in FIG. 2A), a display 330 (e.g., display 201 in FIG. 2A), at least one board 341 and 342 (e.g., printed circuit board (PCB), flexible PCB (FPCB), or rigid-flexible PCB (R-FPCB)), a battery 350, at least one additional support member 361 and 362 (e.g., rear case), at least one antenna module 500 and 370, and a rear cover 380 (e.g., rear plate 211 in FIG. 2B). In a certain embodiment, at least one of the components of the electronic device 300 (e.g., support member 311 or at least one additional support member 361 or 362) may be omitted, or the electronic device 300 may further include another component. At least one of the components of the electronic device 300 may be the same as or similar to at least one of the components of the electronic device 101 of FIG. 1 or the electronic device 200 of FIG. 2A, and repeated descriptions may be omitted.

According to various embodiments, the lateral member 310 may include a first surface 3101 facing in a first direction (e.g., z-axis direction), a second surface 3102 facing in a direction opposite to the first surface 3101, and a lateral surface 3103 surrounding the space between the first surface 3101 and the second surface 3102. According to an embodiment, at least a portion of the lateral surface 3103 may constitute the external appearance of the electronic device 300. According to an embodiment, the support member 311 may be disposed in such a way that it extends from the lateral member 310 toward the internal space of the electronic device 300. In a certain embodiment, the support member 311 may be disposed separately from the lateral member 310. According to an embodiment, the lateral member 310 and/or the support member 311 may be made of, for example, a metal material and/or a non-metal material (e.g., polymer). According to an embodiment, the support member 311 may be disposed to support at least a portion of the display 330 through the first surface 3101, and support at least some of the at least one board 341 and 342 and/or the battery 350 through the second surface 3102. According to an embodiment, the at least one board 341 and 342 may include a first board 341 (e.g., main board) disposed on one side with respect to the battery 350 in the internal space of the electronic device 300, and a second board 342 (e.g., sub board) disposed on the other side. According to an embodiment, the first board 341 and/or the second board 342 may include a processor, a memory, and/or an interface. According to an embodiment, the processor may include one or more of, for example, a central processing unit, an application processor, a graphics processing unit, an image signal processor, a sensor hub processor, or a communication processor. According to an embodiment, the memory may include, for example, a volatile memory or a non-volatile memory. According to an embodiment, the interface may include, for example, a high definition multimedia interface (HDMI), a universal serial bus (USB) interface, an SD card interface, and/or an audio interface. The interface may, for example, electrically or physically connect the electronic device 300 to an external electronic device, and may include a USB connector, an SD card/MMC connector, or an audio connector. According to an embodiment, the battery 350 is a unit for supplying power to at least one component of the electronic device 300, and may include, for example, a non-rechargeable primary cell, a rechargeable secondary cell, or a fuel cell. At least some of the battery 350 may be disposed substantially on the same plane as, for example, the at least one board 341 and 342. According to an embodiment, the battery 350 may be disposed in a manner of being embedded in the electronic device 300. In a certain embodiment, the battery 350 may be disposed in a manner of being detachable from the electronic device 300.

According to various embodiments, the at least one antenna module 500 and 370 may include a first antenna module 500 and a second antenna module 370 disposed between the second surface 3102 of the lateral member 310 and the rear cover 380. According to an embodiment, the first antenna module 500 may include an ultra wide band (UWB) antenna module. According to an embodiment, the second antenna module 370 may also be disposed between the rear cover 380 and the battery 350. According to an embodiment, the second antenna module 370 may include, for example, a near field communication (NFC) antenna, a wireless charging antenna, and/or a magnetic secure transmission (MST) antenna. The second antenna module 370 may perform short-range communication with, for example, an external device, or wirelessly transmit and receive power required for charging. In a certain embodiment, an antenna structure may be formed by parts of the lateral member 310 and/or the support member 311 or a combination thereof. In a certain embodiment, the electronic device 300 may further include a digitizer for detecting an external electronic pen.

According to various embodiments, to communicate with an external electronic device, the first antenna module 500 may be disposed in the space between the lateral member 310 and the rear cover 380, and may be arranged to form a beam pattern in a direction the rear cover 380 faces (e.g., negative z-axis direction). According to an embodiment, the first antenna module 500 may be disposed to be supported by at least one additional support member 361 and may be electrically connected to the at least one board 341. According to an embodiment, the first antenna module 500 may include a plurality of antenna structures (e.g., antenna structures 501, 502, 503 in FIG. 4) arranged at specified intervals on a substrate (e.g., substrate 590 in FIG. 4), and may be configured to generate circular polarization in a designated direction, so that it can improve reception accuracy of radio signals received from an external electronic device.

Figure 4:
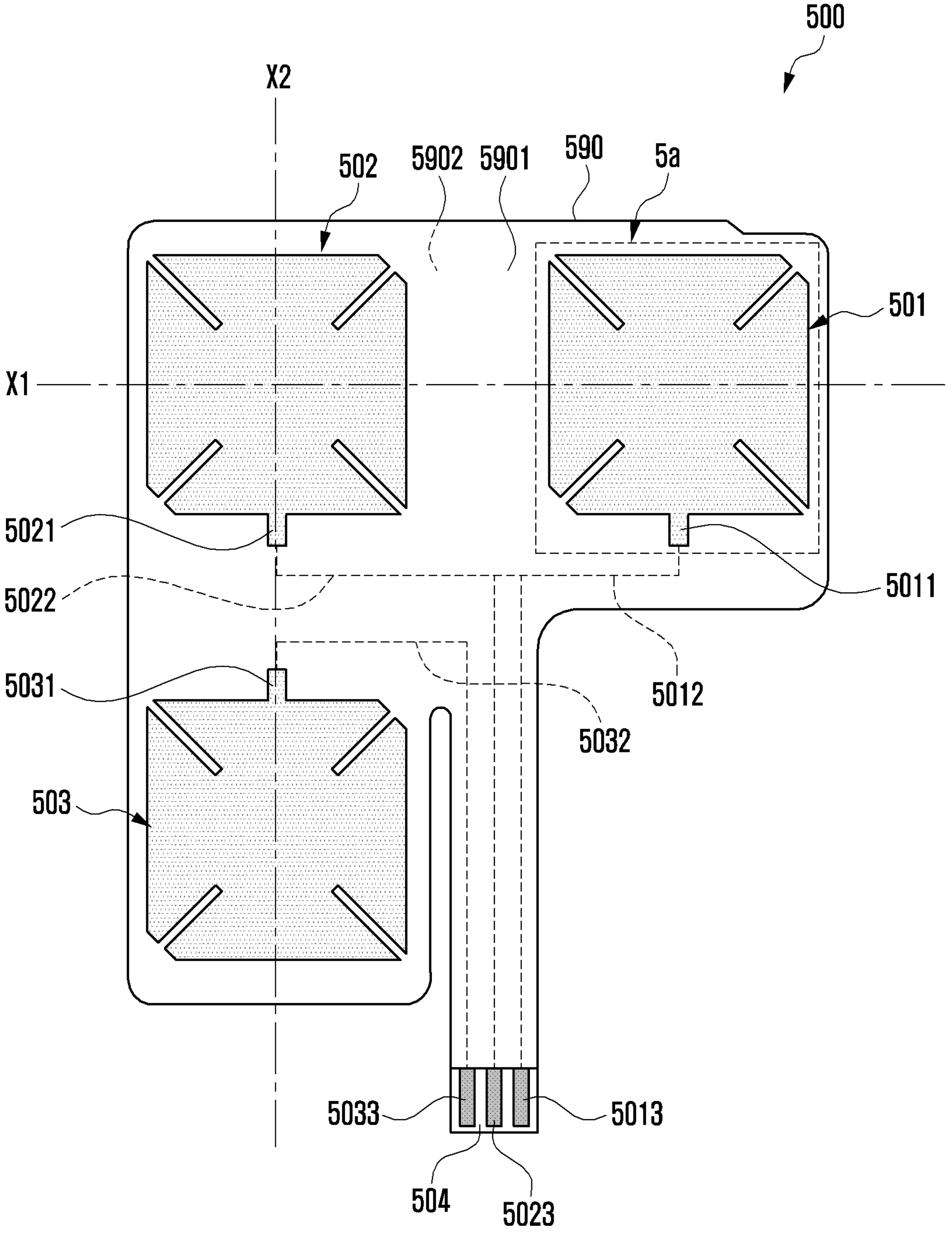
FIG. 4 is a configuration diagram of an antenna module, according to one or more embodiments of the disclosure.

FIG. 4 is a configuration diagram of an antenna module, according to one or more embodiments of the disclosure.

The antenna module 500 of FIG. 4 may be substantially the same as the first antenna module 500 in FIG. 3A or may further include another embodiment of an antenna module.

With reference to FIG. 4, the antenna module 500 may include a substrate 590 including a first substrate surface 5901 and a second substrate surface 5902 facing in a direction opposite to the first substrate surface 5901, and a plurality of antenna structures 501, 502, 503 arranged at specified intervals in at least one of insulating layers between the first substrate surface 5901 and the second substrate surface 5902 of the substrate 590. According to an embodiment, the substrate 590 may include a flexible printed circuit board (FPCB) or a rigid printed circuit board (R-PCB). According to an embodiment, the plurality of antenna structures 501, 502, 503 may include a first antenna structure 501 and a second antenna structure 502 arranged at specified intervals with respect to a first axis X1, or a third antenna structure 503 spaced apart at a specified interval from the second antenna structure 502 on a second axis X2 that passes through the second antenna structure 502 and is not parallel to the first axis X1. According to an embodiment, the first axis X1 and the second axis X2 may be arranged to be substantially perpendicular to each other. According to an embodiment, the first axis X2 may be substantially parallel to the x-axis direction of the electronic device 300 in FIG. 3A. According to an embodiment, the second axis X1 may be substantially parallel to the y-axis direction of the electronic device 300 in FIG. 3A.

According to various embodiments, the antenna module 500 may include a connector portion 504 including a plurality of conductive contacts 5013, 5023, 5033 that are extended from the substrate 590 and are at least partially exposed to the outside. According to an embodiment, the plurality of conductive contacts 5013, 5023, 5033 may include a first conductive contact 5013 electrically connected to a feeder 5011 of the first antenna structure 501 through a first electrical path 5012 disposed on the substrate 590, a second conductive contact 5023 electrically connected to a feeder 5021 of the second antenna structure 502 through a second electrical path 5022 disposed on the substrate 590, and/or a third conductive contact 5033 electrically connected to a feeder 5031 of the third antenna structure 503 through a third electrical path 5032 disposed on the substrate 590. According to an embodiment, the first electrical path 5012, the second electrical path 5022, and/or the third electrical path 5032 may include a wiring structure (e.g., conductive pattern) disposed on the substrate 590. According to an embodiment, the antenna module 500 may be electrically connected through the connector portion 504 to the board (e.g., first board 341 in FIG. 3A) disposed in the internal space of the electronic device (e.g., electronic device 300 in FIG. 3A). According to an embodiment, the antenna module 500 may include a wireless communication circuit (e.g., wireless communication module 192 in FIG. 1) disposed in the internal space of the electronic device (e.g., electronic device 300 in FIG. 3A). According to an embodiment, the wireless communication circuit (e.g., wireless communication module 192 in FIG. 1) may be disposed on the second substrate surface 5902 of the substrate 590. In a certain embodiment, the wireless communication circuit (e.g., wireless communication module 192 in FIG. 1) may be disposed on the board (e.g., first board 341 in FIG. 3A) disposed in the internal space of the electronic device (e.g., electronic device 300 in FIG. 3A) and may be electrically connected to the plurality of antenna structures 501, 502, 503 through the connector portion 504.

According to various embodiments, the processor (e.g., processor 120 in FIG. 1) of the electronic device (e.g., electronic device 300 in FIG. 3A) may detect a first angle (e.g., first received signal angle) calculated based on the time difference and phase difference between radio signals received through the first antenna structure 501 and the second antenna structure 502 aligned along the first axis X1 from an external electronic device. According to an embodiment, the processor (e.g., processor 120 in FIG. 1) of the electronic device (e.g., electronic device 300 in FIG. 3A) may detect a second angle (e.g., second received signal angle) calculated based on the time difference and phase difference between radio signals received through the second antenna structure 502 and the third antenna structure 503 aligned along the second axis X1 from the external electronic device. According to an embodiment, the processor (e.g., processor 120 in FIG. 1) of the electronic device (e.g., electronic device 300 of FIG. 3A) may determine the direction and position of the external electronic device by using the detected first and second angles. According to an embodiment, the processor (e.g., processor 120 in FIG. 1) of the electronic device (e.g., electronic device 300 of FIG. 3A) may display information about the determined direction and position of the external electronic device on the display (e.g., display 330 in FIG. 3A).

According to various embodiments, the antenna structures 501, 502, 503 of the antenna module 500 may be operated as antenna structures operating in different frequency bands (e.g., dual bands). According to an embodiment, the antenna structures 501, 502, 503 of the antenna module 500 may operate in a frequency band ranging from approximately 3.735 GHz to 10.2 GHz. For example, the plurality of antenna structures 501, 502, 503 of the antenna module 500 may be operated as a dual band circularly polarized antenna including a first frequency band operating with a first circularly polarized wave (e.g., right hand circularly polarized (RHCP) wave) and a second frequency band lower than the first frequency band and operating with a second circularly polarized wave (e.g., left hand circularly polarized (LHCP) wave) perpendicular to the first circularly polarized wave.

Figure 5A:
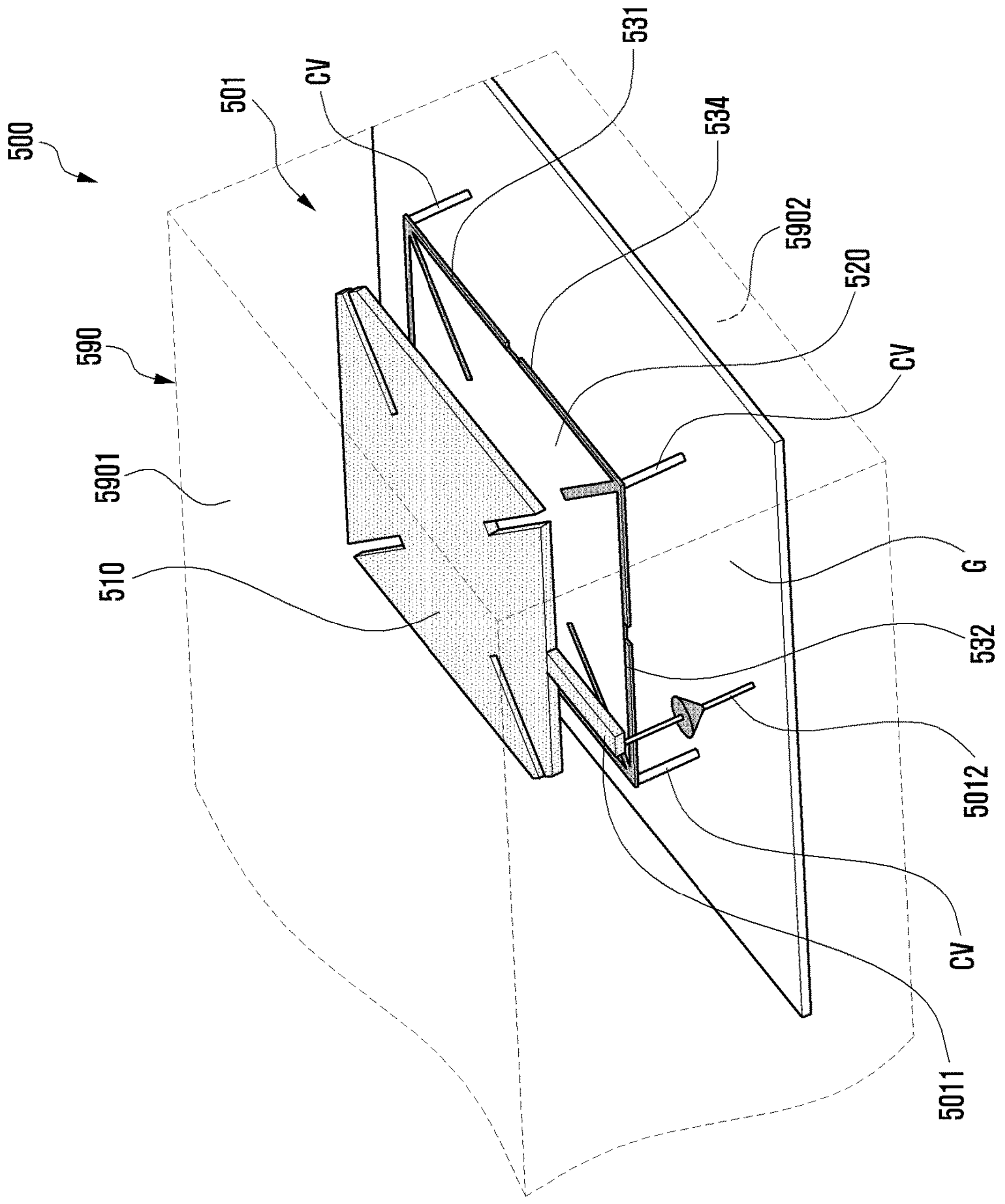
FIG. 5A is a perspective view showing the stacked structure of an antenna structure disposed in region 5*a* of FIG. 4, according to one or more embodiments of the disclosure.

FIG. 5A is a perspective view showing the stacked structure of an antenna structure disposed in region 5*a* of FIG. 4, according to one or more embodiments of the disclosure.

The antenna structure 501 of FIG. 5A may be substantially the same as the first antenna structure 501, the second antenna structure 502, or the third antenna structure 503 in FIG. 4, or may further include another embodiment of an antenna structure.

With reference to FIG. 5A, the antenna structure 501 (e.g., first antenna structure 501 in FIG. 4) included in the antenna module 500 (e.g., antenna module 500 in FIG. 4) may include a substrate 590 (e.g., substrate 590 in FIG. 4) including a first substrate surface 5901 and a second substrate surface 5902 facing in an opposite direction to the first substrate surface 5901, a ground layer G disposed on one of plural insulating layers between the first substrate surface 5901 and the second substrate surface 5902, a first conductive patch 510 disposed between the first substrate surface 5901 and the ground layer G, a second conductive patch 520 disposed between the first conductive patch 510 and the ground layer G, and a plurality of conductive pads (531, 532, 534, and 533 in FIG. 5C) on the same layer as the second conductive patch 520 and spaced apart at specified intervals along the edge of the second conductive patch 520.

According to various embodiments, the first conductive patch 510 may be electrically connected to the wireless communication circuit (e.g., wireless communication module 192 in FIG. 1) disposed in the internal space of the electronic device. According to an embodiment, the first conductive patch 510 may include a feeder 5011 extended outward from at least a portion thereof, and may be electrically connected to the wireless communication circuit (e.g., wireless communication circuit in FIG. 1) through an electrical path 5012 formed on the substrate 590. In a certain embodiment, the feeder 5011 may be disposed at a specified location overlapping with the first conductive patch 510 when the first substrate surface 5901 is viewed from above.

According to various embodiments, the second conductive patch 520 may have substantially the same size and/or shape as the first conductive patch 510 and may be arranged to overlap therewith when the first substrate surface 5901 is viewed from above. According to an embodiment, the second conductive patch 520 may be disposed at a position where it can be coupled from the first conductive patch 510. According to an embodiment, the second conductive patch 520 may be operated as an antenna radiator by using an electric field coupled from the first conductive patch 510.

According to various embodiments, a plurality of conductive pads (531, 532, 534, and 533 in FIG. 5C) may be arranged at specified intervals along the edge of the second conductive patch 520. According to an embodiment, the plural conductive pads (531, 532, 534, and 533 in FIG. 5C) may be electrically connected to the ground layer G of the substrate 590. According to an embodiment, the plural conductive pads (531, 532, 534, and 533 in FIG. 5C) may be electrically connected to the ground layer G through at least one conductive via CV.

According to various embodiments, the antenna structure 501 may be operated as a dual-band circularly polarized antenna. According to an embodiment, the antenna structure 501 may operate with a first circularly polarized wave (e.g., RHCP wave) in a first frequency band (e.g., CH9 band (about 7.2 GHz to 10.2 GHz band)) by use of the first conductive patch 510. According to an embodiment, the antenna structure 501 may operate with a second circularly polarized wave (e.g., LHCP wave) in a second frequency band (e.g., CH5 band (about 3.735 GHz to 4.8 GHz band)) different from the first frequency band by use of the second conductive patch 520. According to an embodiment, the polarization directions of the first circularly polarized wave and the second circularly polarized wave may be the same or different from each other. According to an embodiment, in the second conductive patch 520, the axial ratio (AR) and/or direction of circular polarization may be determined according to the amount of coupling and/or a change in impedance value between at least some conductive pads 531 and 533 among the plural conductive pads (531, 532, 534, and 533 in FIG. 5C) and the second conductive patch 520.

Next, a detailed description will be given of the arrangement structure between the conductive patches 510 and 520 and the plural conductive pads (531, 532, 534, and 533 in FIG. 5C).

Figure 5B:
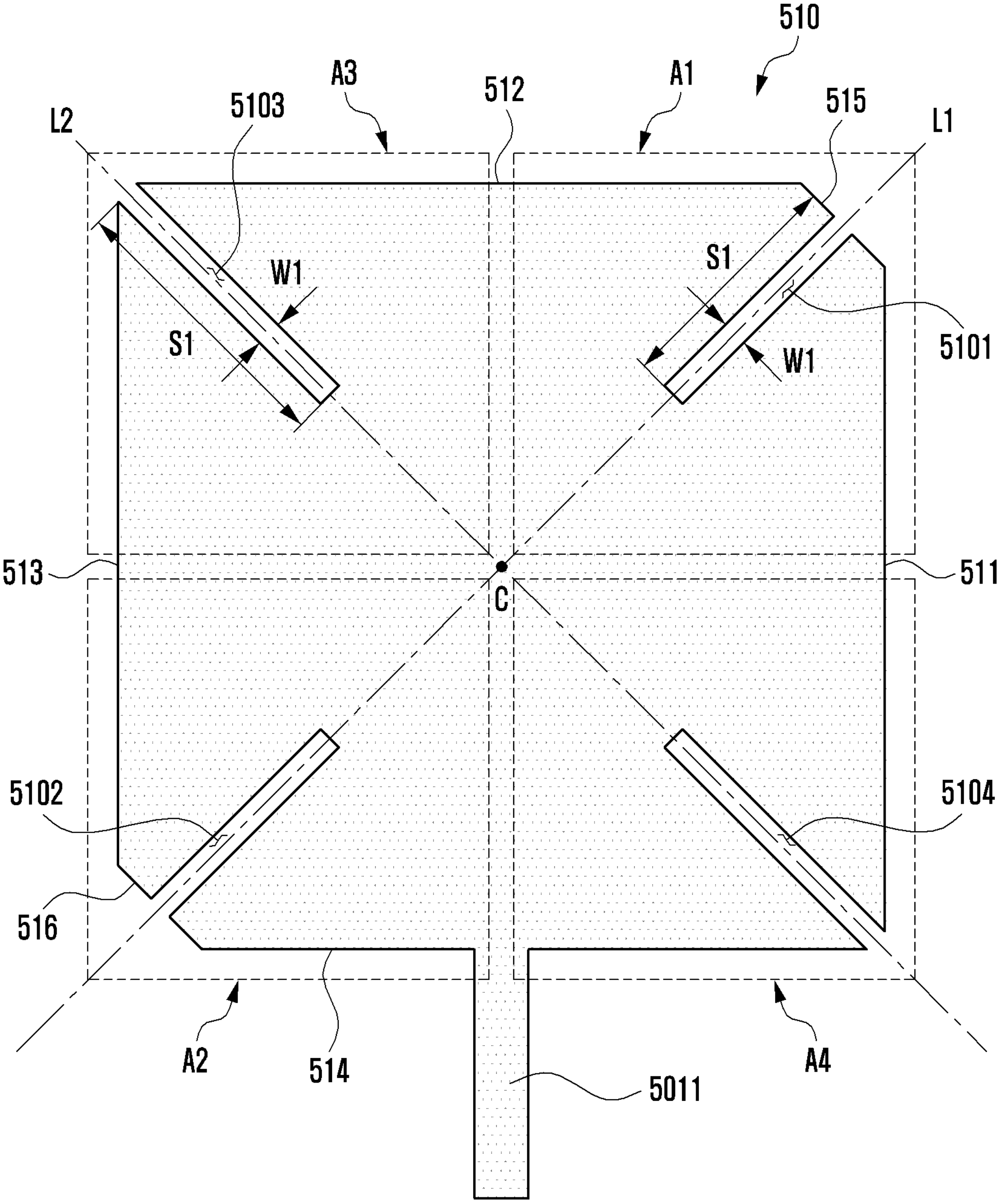
FIG. 5B is a plan view showing the arrangement structure of a first conductive patch according to one or more embodiments of the disclosure.

FIG. 5B is a plan view showing the arrangement structure of the first conductive patch according to one or more embodiments of the disclosure.

With reference to FIG. 5B, the first conductive patch 510 may be formed in a rectangular shape (e.g., square). According to an embodiment, the first conductive patch 510 may include a first side 511, a second side 512 extended substantially perpendicularly from the first side 511, a third side 513 extended substantially perpendicularly from the second side 512, and a fourth side 514 extended substantially perpendicularly from the third side 513 and connected to the first side 511. According to an embodiment, the feeder 5011 may be extended from at least a portion of the fourth side 514. According to an embodiment, the antenna structure 501 may include a first region A1 (e.g., upper right region) including at least a portion (e.g., about ½) of the first side 511 of the first conductive patch 510 and at least a portion (e.g., about ½) of the second side 512, a second region A2 (e.g., lower left region) including at least a portion (e.g., about ½) of the third side 513 and at least a portion (e.g., about ½) of the fourth side 514, a third region A3 (e.g., upper left region) including at least a portion (e.g., about ½) of the second side 512 and at least a portion (e.g., about ½) of the third side 513, and a fourth region A4 (e.g., lower right region) including at least a portion (e.g., about ½) of the first side 511 and at least a portion (e.g., about ½) of the fourth side 514. According to an embodiment, the first conductive patch 510 may include a first cut portion 515 at which the corner portion where the first side 511 and the second side 512 meet is cut in the first region A1, and a second cut portion 516 at which the corner portion where the third side 513 and the fourth side 514 meet is cut in the second region A2. According to an embodiment, the first conductive patch 510 may be operated to have circular polarization (e.g., RHCP) in which the electric field rotates in a specified direction (e.g., counterclockwise), through the first cut portion 515 and the second cut portion 516. In a certain embodiment, the first conductive patch 510 may include cut portions formed at the corners of the third region A3 and the fourth region A4 in substantially the same manner to thereby be operated to have circular polarization (e.g., LHCP) in which the electric field rotates in a direction opposite to the above-mentioned direction (e.g., clockwise).

According to various embodiments, the first conductive patch 510 may include a first diagonal L1 passing through the center C, first region A1, and second region A2, and a second diagonal L2 that intersects the first diagonal L1 and passes through the center C, third region A3, and fourth region A4. According to an embodiment, the first conductive patch 510 may include a first slit 5101 that has a specified first length S1 and a specified first width W1 and is formed in the first region A1 along the first diagonal L1 from the corner where the first side 511 and the second side 512 meet (e.g., first cut portion 515) toward the center C. According to an embodiment, the first conductive patch 510 may include a second slit 5102 that has a specified first length S1 and a specified first width W1 and is formed in the second region A2 along the first diagonal L1 from the corner where the third side 513 and the fourth side 514 meet (e.g., second cut portion 516) toward the center C. According to an embodiment, the first conductive patch 510 may include a third slit 5103 that has a specified first length S1 and a specified first width W1 and is formed in the third region A3 along the second diagonal L2 from the corner where the second side 512 and the third side 513 meet toward the center C. According to an embodiment, the first conductive patch 510 may include a fourth slit 5104 that has a specified first length S1 and a specified first width W1 and is formed in the fourth region A4 along the second diagonal L2 from the corner where the first side 511 and the fourth side 514 meet toward the center C. According to an embodiment, the first slit 5101, the second slit 5102, the third slit 5103, and the fourth slit 5104 may be formed to have substantially the same length S1 and width W1. For example, through the first slit 5101, the second slit 5102, the third slit 5103, and the fourth slit 5104, the size of the first conductive patch 510 may be relatively small even if it operates in substantially the same frequency band. According to an embodiment, the operating frequency band of the first conductive patch 510 may be determined according to the length S1 and/or width W1 of the first slit 5101, the second slit 5102, the third slit 5103, and the fourth slit 5104.

Figure 5C:
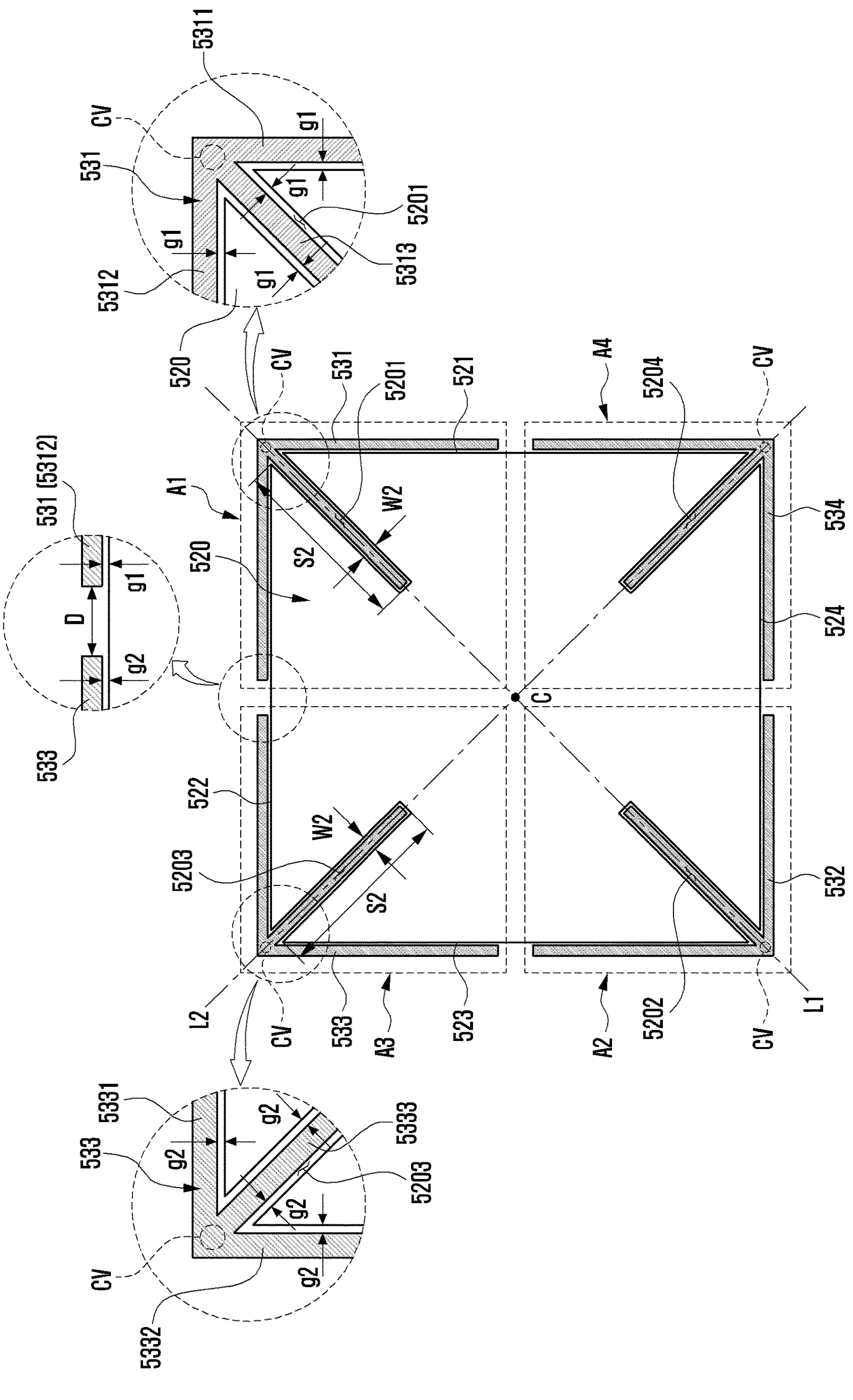
FIG. 5C is a plan view showing the arrangement structure of a second conductive patch, according to one or more embodiments of the disclosure.

FIG. 5C is a plan view showing the arrangement structure of the second conductive patch, according to one or more embodiments of the disclosure.

With reference to FIG. 5C, the second conductive patch 520 may include, between the first conductive patch (e.g., first conductive patch 510 in FIG. 4) disposed on the substrate (e.g., substrate 590 in FIG. 4) and the ground layer G, a fifth side 521, a sixth side 522 extended substantially perpendicularly from the fifth side 521, a seventh side 523 extended substantially perpendicularly from the sixth side 522, and an eighth side 524 extended substantially perpendicularly from the seventh side 523 and connected to the fifth side 521. According to an embodiment, the antenna structure 501 may include at least a portion (e.g., about ½) of the fifth side 521 and at least a portion (e.g., about ½) of the sixth side 522 of the second conductive patch 520 in the first region A1 (e.g., upper right region), at least a portion (e.g., about ½) of the seventh side 523 and at least a portion (e.g., about ½) of the eighth side 524 in the second region A2 (e.g., lower left region), at least a portion (e.g., about ½) of the sixth side 522 and at least a portion (e.g., about ½) of the seventh side 523 in the third region A3 (e.g., upper left region), and at least a portion (e.g., about ½) of the fifth side 521 and at least a portion (e.g., about ½) of the eighth side 524 in the fourth region A4 (e.g., lower right region).

According to various embodiments, the second conductive patch 520 may include a first diagonal L1 passing through the center C, first region A1, and second region A2, and a second diagonal L2 that intersects the first diagonal L1 and passes through the center C, third region A3, and fourth region A4. According to an embodiment, the second conductive patch 520 may include a fifth slit 5201 that has a specified second length S2 and a specified second width W2 and is formed in the first region A1 along the first diagonal L1 from the corner where the fifth side 521 and the sixth side 522 meet toward the center C. According to an embodiment, the second conductive patch 520 may include a sixth slit 5202 that has a specified second length S2 and a specified second width W2 and is formed in the second region A2 along the first diagonal L1 from the corner where the seventh side 523 and the eighth side 524 meet toward the center C. According to an embodiment, the second conductive patch 520 may include a seventh slit 5203 that has a specified second length S2 and a specified second width W2 and is formed in the third region A3 along the second diagonal L2 from the corner where the sixth side 522 and the seventh side 523 meet toward the center C. According to an embodiment, the second conductive patch 520 may include a eighth slit 5204 that has a specified second length S2 and a specified second width W2 and is formed in the fourth region A4 along the second diagonal L2 from the corner where the fifth side 521 and the eighth side 524 meet toward the center C. According to an embodiment, the fifth slit 5201, the sixth slit 5202, the seventh slit 5203, and the eighth slit 5204 may be formed to have substantially the same length S2 and width W2. For example, through the fifth slit 5201, the sixth slit 5202, the seventh slit 5203, and the eighth slit 5204, the size of the second conductive patch 520 may be relatively small even if it operates in substantially the same frequency band. According to an embodiment, the operating frequency band of the second conductive patch 520 may be determined according to the length S2 and/or width W2 of the fifth slit 5201, the sixth slit 5202, the seventh slit 5203, and the eighth slit 5204.

According to various embodiments, the second length S2 and second width W2 of the fifth slit 5201, sixth slit 5202, seventh slit 5203, and eighth slit 5204 of the second conductive patch 520 may be formed to be substantially the same as the first length S1 and first width W1 of the first slit 5101, second slit 5102, third slit 5103, and fourth slit 5104 of the first conductive patch 510. According to an embodiment, when the first substrate surface (e.g., first substrate surface 5901 in FIG. 5A) is viewed from above, the fifth slit 5201, sixth slit 5202, seventh slit 5203, and eighth slit 5204 of the second conductive patch 520 may be arranged to overlap with the first slit 5101, second slit 5102, third slit 5103, and fourth slit 5104 of the first conductive patch 510. In a certain embodiment, the second length S2 and second width W2 of the fifth slit 5201, sixth slit 5202, seventh slit 5203, and eighth slit 5204 of the second conductive patch 520 may be formed to be different from the first length S1 and first width W1 of the first slit 5101, second slit 5102, third slit 5103, and fourth slit 5104 of the first conductive patch 510. In a certain embodiment, when the first substrate surface (e.g., first substrate surface 5901 in FIG. 5A) is viewed from above, the fifth slit 5201, sixth slit 5202, seventh slit 5203, and eighth slit 5204 of the second conductive patch 520 may be arranged not to overlap at least partially with the first slit 5101, second slit 5102, third slit 5103, and fourth slit 5104 of the first conductive patch 510.

According to various embodiments, the antenna structure 501 may include a plurality of conductive pads 531, 532, 533, 534 disposed around the second conductive patch 520 to be electrically coupled to the second conductive patch 520. According to an embodiment, the plural conductive pads 531, 532, 533, 534 may include a first conductive pad 531 disposed to be coupled with the second conductive patch 520 in the first region A1, a second conductive pad 532 disposed to be coupled with the second conductive patch 520 in the second region A2, a third conductive pad 533 disposed to be coupled with the second conductive patch 520 in the third region A3, and a fourth conductive pad 534 disposed to be coupled to the second conductive patch 520 in the fourth region A4.

According to various embodiments, the first conductive pad 531 may be disposed to have a first gap g1 from the second conductive patch 520. According to an embodiment, the first conductive pad 531 may include a first portion 5311 disposed to have a first gap g1 from the fifth side 521 in the first region A1, a second portion 5312 extended from the first portion 5311 to have a first gap g1 from the sixth side 522, and a third portion 5313 branched to extend to the fifth slit 5201 between the first portion 5311 and the second portion 5312 and disposed to have a first gap g1 from the second conductive patch 520. In a certain embodiment, the first portion 5311, the second portion 5312, and the third portion 5313 may be arranged separately. According to an embodiment, for even coupling distribution, the conductive via CV connecting the first conductive pad 531 and the ground layer (e.g., ground layer G in FIG. 4) may be disposed at a point where the first portion 5311, the second portion 5312, and the third portion 5313 meet. According to an embodiment, the second conductive pad 532 disposed in the second region A2 may also be disposed to have a first gap g1 such as to be coupled to the second conductive patch 520 in substantially the same way as the first conductive pad 531, and may be electrically connected to the ground layer G through a conductive via CV. According to an embodiment, the third conductive pad 533 may include a fourth portion 5331 disposed to have a second gap g2 from the sixth side 522 in the third region A3, a fifth portion 5332 extended from the fourth portion 5331 to have a second gap g2 from the seventh side 523, and a sixth portion 5333 branched to extend to the seventh slit 5203 between the fourth portion 5331 and the fifth portion 5332 and disposed to have a second gap g2 from the second conductive patch 520. In a certain embodiment, the fourth portion 5331, the fifth portion 5332, and the sixth portion 5333 may be arranged separately. According to an embodiment, for even coupling distribution, the conductive via CV connecting the third conductive pad 533 and the ground layer may be disposed at a point where the fourth portion 5331, the fifth portion 5332, and the sixth portion 5333 meet. According to an embodiment, the fourth conductive pad 534 disposed in the fourth region A4 may be disposed to have a second gap g2 such as to be coupled with the second conductive patch in substantially the same way as the third conductive pad 533, and may be electrically connected to the ground layer G through a conductive via CV. According to an embodiment, the first conductive pad 531 and the third conductive pad 532 may be arranged to have a specified separation distance D. In substantially the same way, the third conductive pad 533 and the second conductive pad 532, the second conductive pad 532 and the fourth conductive pad 534, and the first conductive pad 531 and the fourth conductive pad 534 can also be arranged to have a specified separation distance D. For example, the specified separation distance D may include a minimum of about 0.03 mm.

Figure 6A:
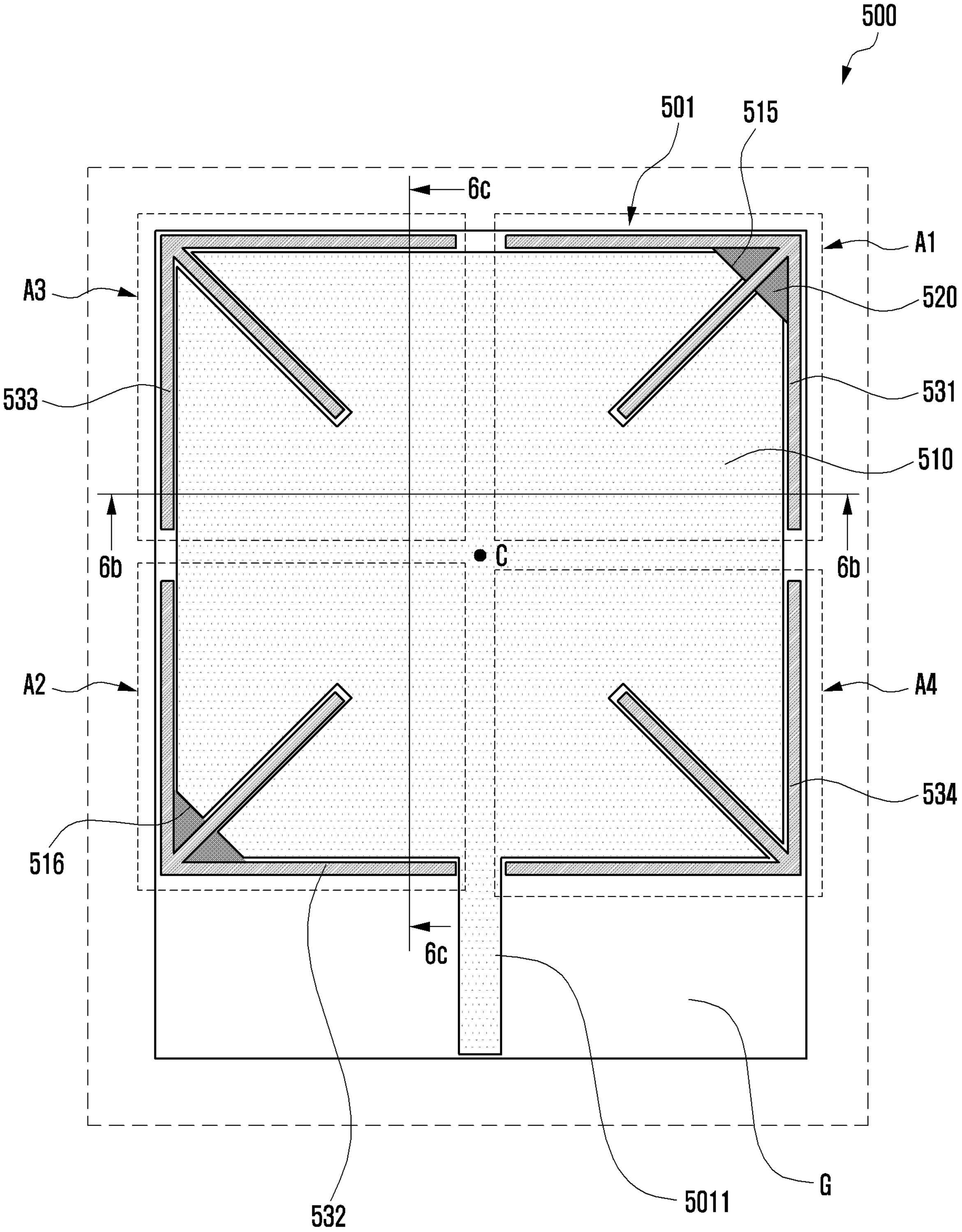
FIG. 6A is a plan view of an antenna structure illustrating the arrangement structure of the first conductive patch and the second conductive patch according to one or more embodiments of the disclosure.
Figure 6B:
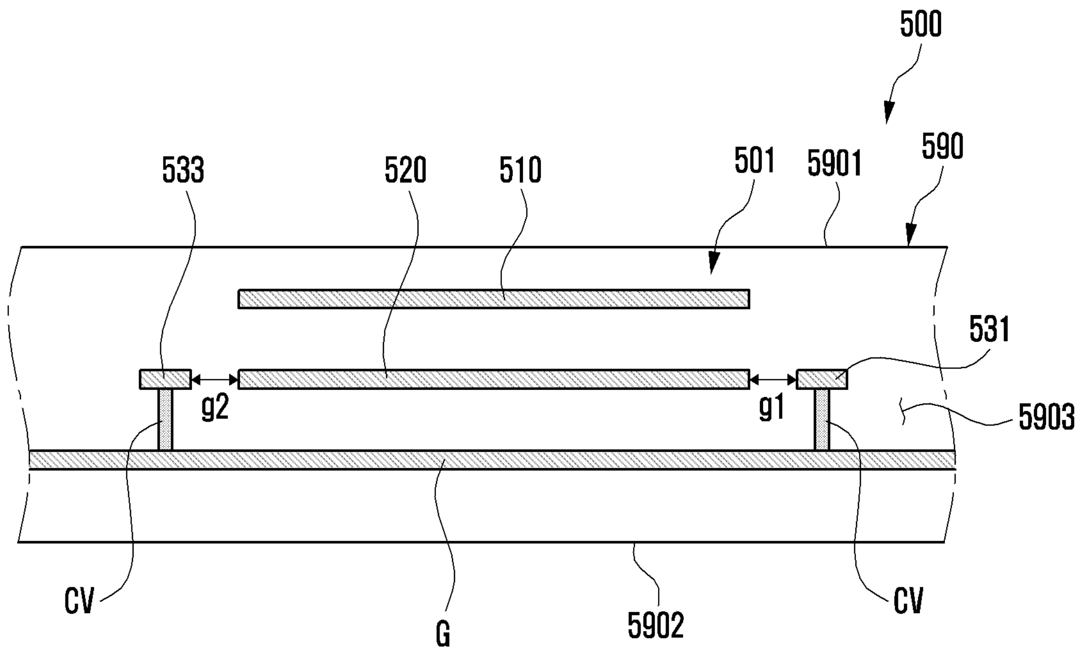
FIG. 6B is a partial cross-sectional view of the antenna structure viewed along line 6*b*-6*b* of FIG. 6A according to one or more embodiments of the disclosure.
Figure 6C:
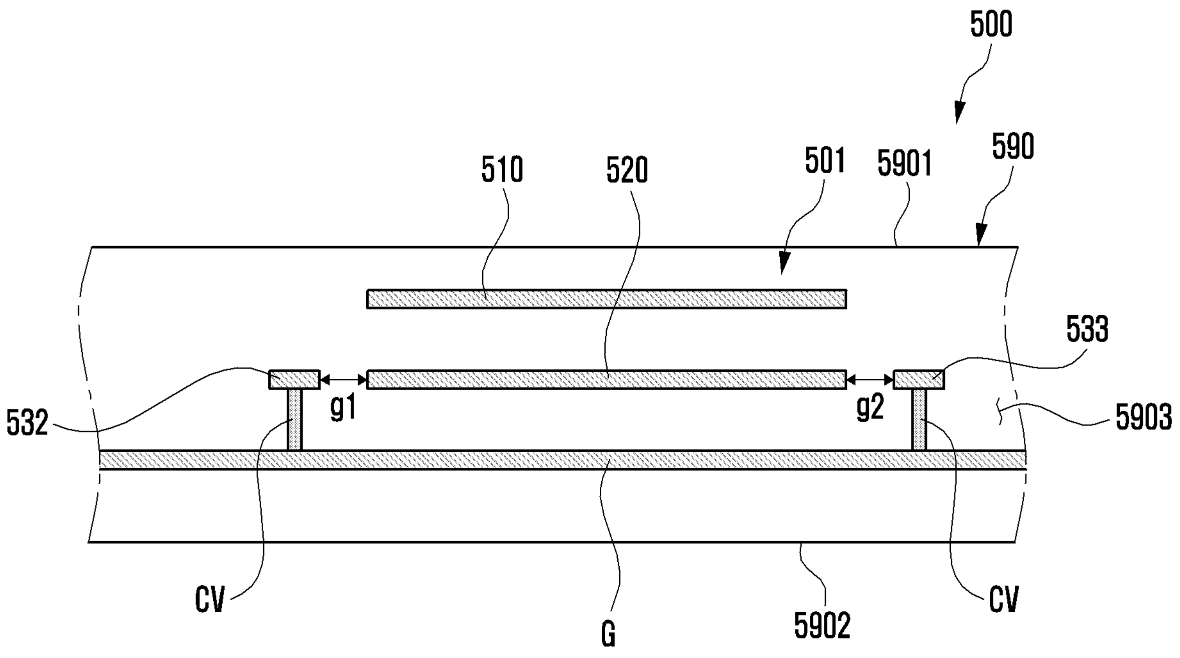
FIG. 6C is a partial cross-sectional view of the antenna structure viewed along line 6*c*-6*c* of FIG. 6A according to one or more embodiments of the disclosure.

FIG. 6A is a plan view of an antenna structure illustrating the arrangement structure of the first conductive patch and the second conductive patch, according to one or more embodiments of the disclosure. FIG. 6B is a partial cross-sectional view of the antenna structure viewed along line 6*b*-6*b* of FIG. 6A, according to one or more embodiments of the disclosure. FIG. 6C is a partial cross-sectional view of the antenna structure viewed along line 6*c*-6*c* of FIG. 6A according to one or more embodiments of the disclosure.

With reference to FIGS. 6A to 6C, the antenna structure 501 may include a ground layer G disposed between the first substrate surface 5901 and the second substrate surface 5902 of the substrate 590, a first conductive patch 510 disposed between the ground layer G and the first substrate surface 5901, a second conductive patch 520 disposed between the first conductive patch 510 and the ground layer G to be coupled with the first conductive patch 510, and a plurality of conductive pads 531, 532, 533, 534 that are disposed on the same layer as the second conductive patch 520 along the edge of the second conductive patch 520 so as to be coupled therewith and are electrically connected through conductive vias CV to the ground layer G. According to an embodiment, the first conductive pad 531 may be disposed in the first region A1 to be coupled to the second conductive patch 520, the second conductive pad 532 may be disposed in the second region A2 to be coupled to the second conductive patch 520, the third conductive pad 533 may be disposed in the third region A3 to be coupled to the second conductive patch 520, and the fourth conductive pad 534 may be disposed in the fourth region A4 to be coupled to the second conductive patch 520. For example, the first conductive pad 531 and the second conductive pad 532 disposed symmetrically with respect to the center C along the first diagonal (e.g., first diagonal L1 in FIG. 5C) of the second conductive patch 520 may be arranged to have a first gap g1 from the edge of the second conductive patch 520. According to an embodiment, the third conductive pad 533 and the fourth conductive pad 534 disposed symmetrically with respect to the center C along the second diagonal (e.g., second diagonal L2 in FIG. 5C) of the second conductive patch 520 may be arranged to have a second gap g2 from the edge of the second conductive patch 520. According to an embodiment, the first gap g1 and the second gap g2 may be substantially the same. According to an embodiment, the first gap g1 and the second gap g2 may be different from each other.

Next, a detailed description will be given of the radiation performance of the antenna structure 501 according to the first gap g1 and the second gap g2.

Figure 7A:
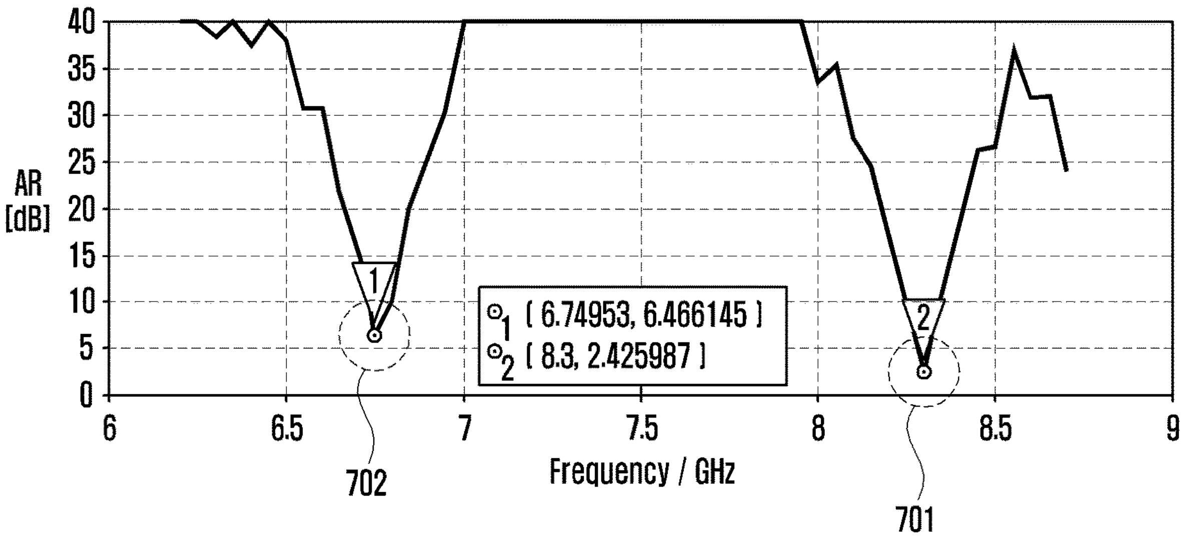
FIG. 7A is a graph showing axial ratio (AR) characteristics of the antenna structure having the configuration of FIGS. 5A to 5C according to one or more embodiments of the disclosure.
Figure 7B:
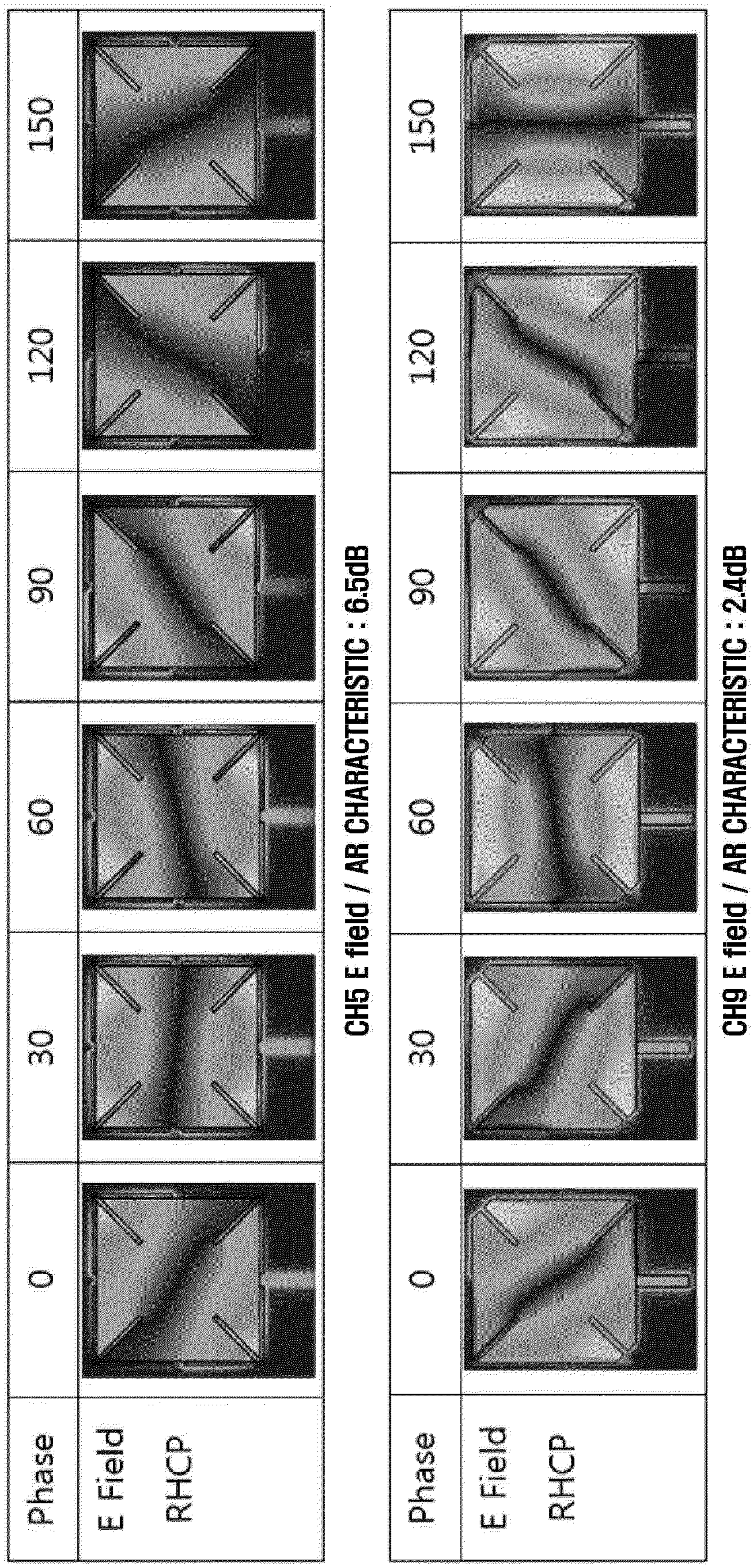
FIG. 7B is diagrams showing a change in electric field distribution according to a phase change in the antenna structure of FIGS. 5A to 5C according to one or more embodiments of the disclosure.

FIG. 7A is a graph showing axial ratio (AR) characteristics of the antenna structure having the configuration of FIGS. 5A to 5C, according to one or more embodiments of the disclosure. FIG. 7B is diagrams showing a change in electric field distribution according to a phase change in the antenna structure of FIGS. 5A to 5C, according to one or more embodiments of the disclosure.

With reference to FIGS. 7A and 7B, it can be seen that, when the first gap g1 between the first conductive pad 531 and second conductive pad 532 and the second conductive patch 520 is equal to the second gap g2 between the third conductive pad 533 and fourth conductive pad 534 and the second conductive patch 520 as shown in FIG. 5C, the antenna structure 501 operates as a dual-band circularly polarized antenna, where an AR characteristic of about 2.4 dB is exhibited in a first frequency band (e.g., CH9 (about 8.3 GHz band)) through the first conductive patch 510 (region 701), and an AR characteristic of about 6.5 dB is exhibited in a second frequency band (e.g., CH5 (about 6.7 Ghz band)) lower than the first frequency through the second conductive patch 520 (region 702). For example, it can be seen that, in both the first conductive patch 510 and the second conductive patch 520 of the antenna structure 501, the movement of the electric field distribution along the phase change operates in RHCP.

Figure 8:
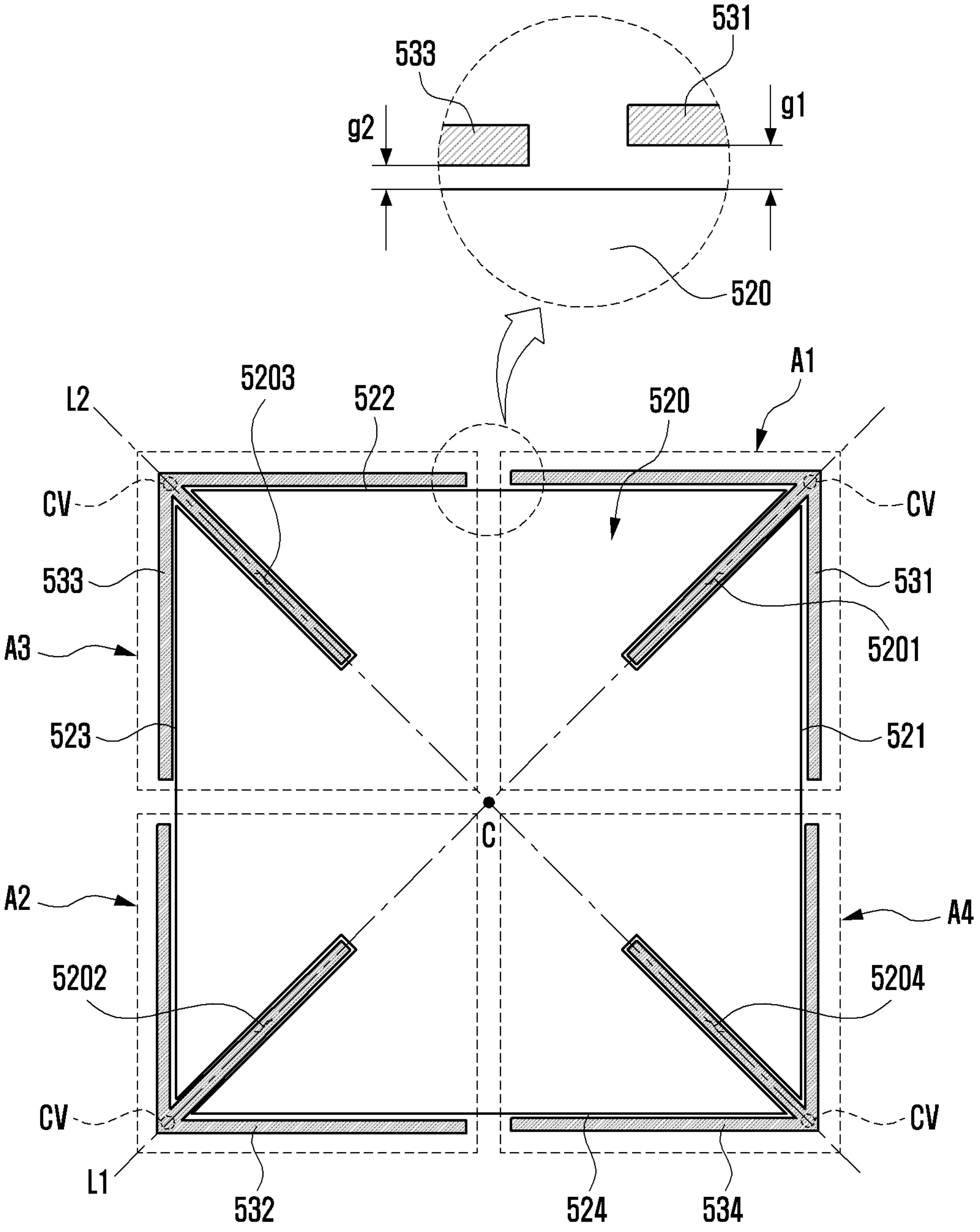
FIG. 8 is a plan view of a second conductive patch having an arrangement structure in which a first gap from the first conductive pad in a first region is greater than a second gap from the third conductive pad in a third region according to one or more embodiments of the disclosure.

FIG. 8 is a plan view of the second conductive patch having an arrangement structure in which a first gap from the first conductive pad in the first region is greater than a second gap from the third conductive pad in the third region, according to one or more embodiments of the disclosure.

In describing the second conductive patch 520 in FIG. 8 and plural conductive pads 531, 532, 533, 534 arranged thereabout, the same reference symbols are given to the same components as in FIG. 5C, and a detailed description thereof may be omitted.

With reference to FIG. 8, the antenna structure (e.g., antenna structure 501 in FIG. 5A) may include a plurality of conductive pads 531, 532, 533, 534 disposed along the edge of the second conductive patch 520. According to an embodiment, among the plural conductive pads 531, 532, 533, 534, the first gap g1 between the first conductive pad 531 and second conductive pad 532 and the second conductive patch 520 may be arranged to be greater than the second gap g2 between the third conductive pad 533 and fourth conductive pad 534 and the second conductive patch 520. In this case, the amount of coupling between the third conductive pad 533 and fourth conductive pad 534 and the second conductive patch 520 may be set to be greater than the amount of coupling between the first conductive pad 531 and second conductive pad 532 and the second conductive patch 520.

Figure 9A:
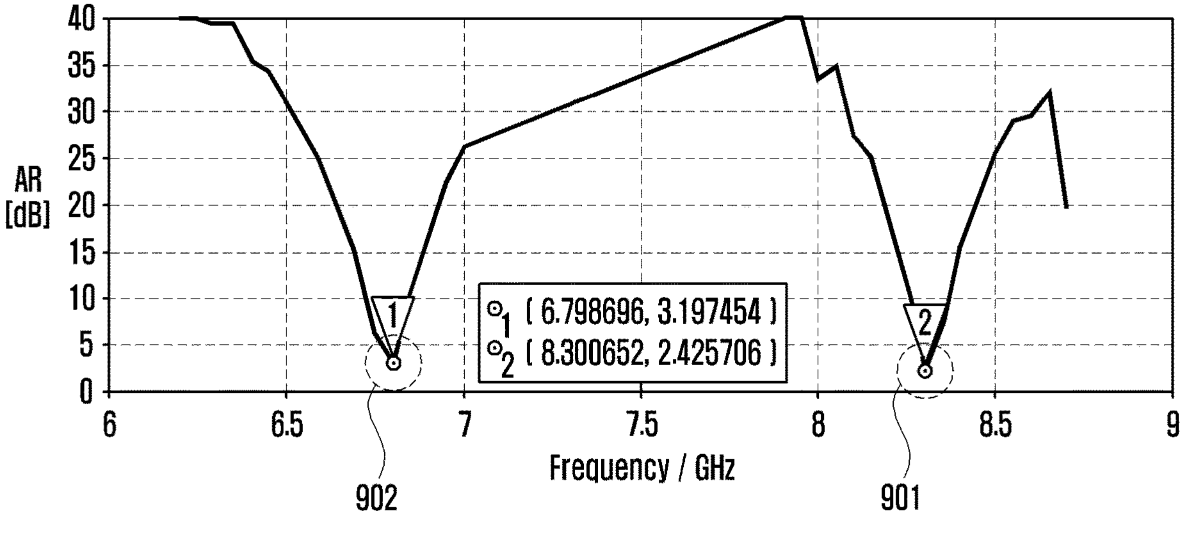
FIG. 9A is a graph showing AR characteristics of an antenna structure including a second conductive patch having the arrangement structure of FIG. 8 according to one or more embodiments of the disclosure.
Figure 9B:
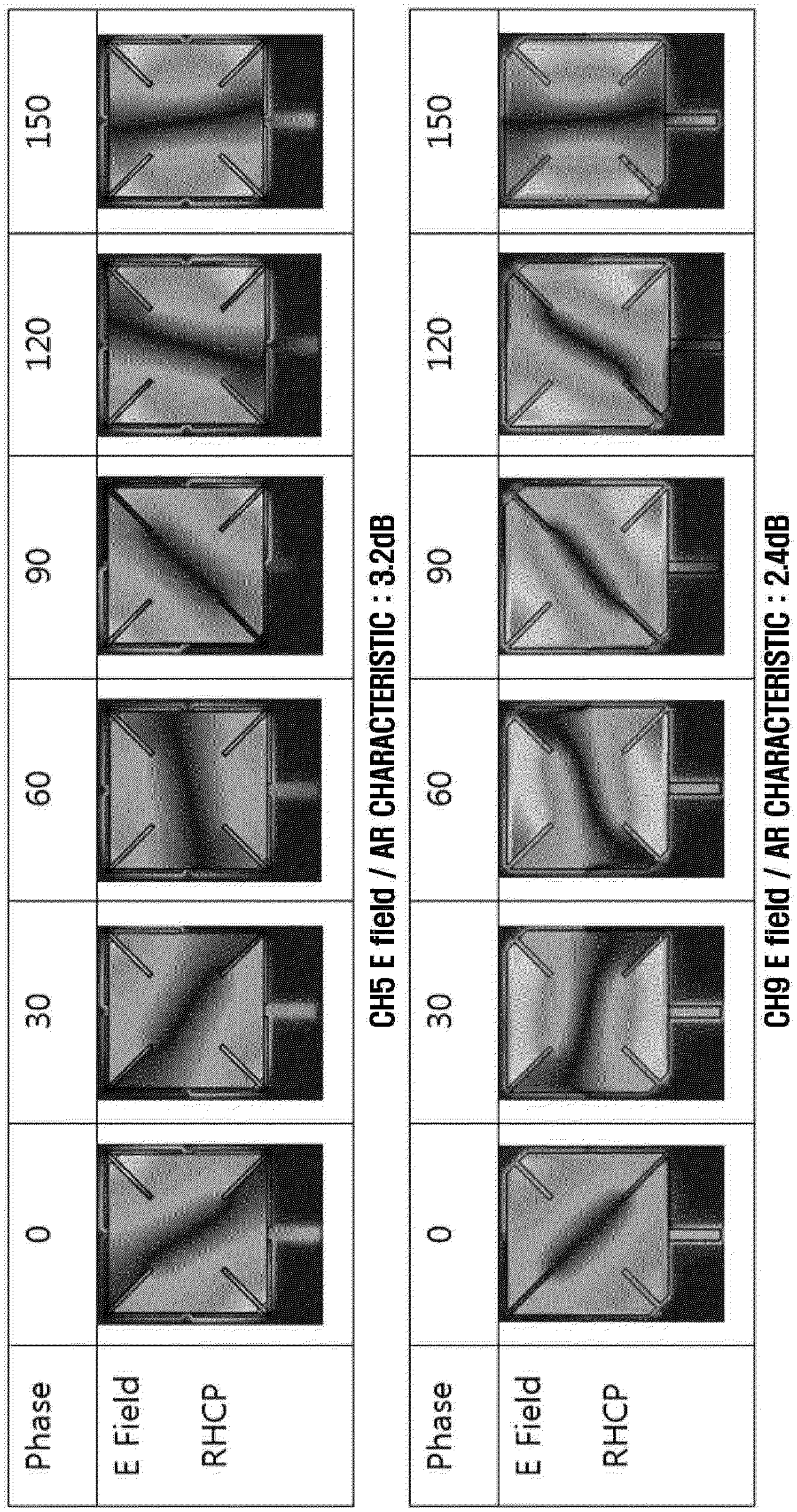
FIG. 9B is diagrams showing a change in electric field distribution according to a phase change in the antenna structure of FIG. 8 according to one or more embodiments of the disclosure.

FIG. 9A is a graph showing AR characteristics of an antenna structure including the second conductive patch having the arrangement structure of FIG. 8, according to one or more embodiments of the disclosure. FIG. 9B is diagrams showing a change in electric field distribution according to a phase change in the antenna structure of FIG. 8, according to one or more embodiments of the disclosure.

With reference to FIGS. 9A and 9B, it can be seen that, when the first gap g1 between the first conductive pad 531 and second conductive pad 532 and the second conductive patch 520 is set to be greater than the second gap g2 between the third conductive pad 533 and fourth conductive pad 534 and the second conductive patch 520 as shown in FIG. 8, the antenna structure 501 operates as a dual-band circularly polarized antenna, where an AR characteristic of about 2.4 dB is exhibited in a first frequency band (e.g., CH9 (about 8.3 GHz band)) through the first conductive patch 510 (region 901), and an AR characteristic of about 3.5 dB is exhibited in a second frequency band (e.g., CH5 (about 6.7 Ghz band)) lower than the first frequency through the second conductive patch 520 (region 902). In this case, it can be seen that the AR characteristic of the second conductive patch operating in the second frequency band is improved closer to 0 dB compared to the case of FIGS. 7A and 7B, which may mean that the second conductive patch forms a relatively circular polarization. According to an embodiment, it can be seen that, in both the first conductive patch 510 and the second conductive patch 520 of the antenna structure 501, the movement of the electric field distribution along the phase change operates in RHCP.

Figure 10:
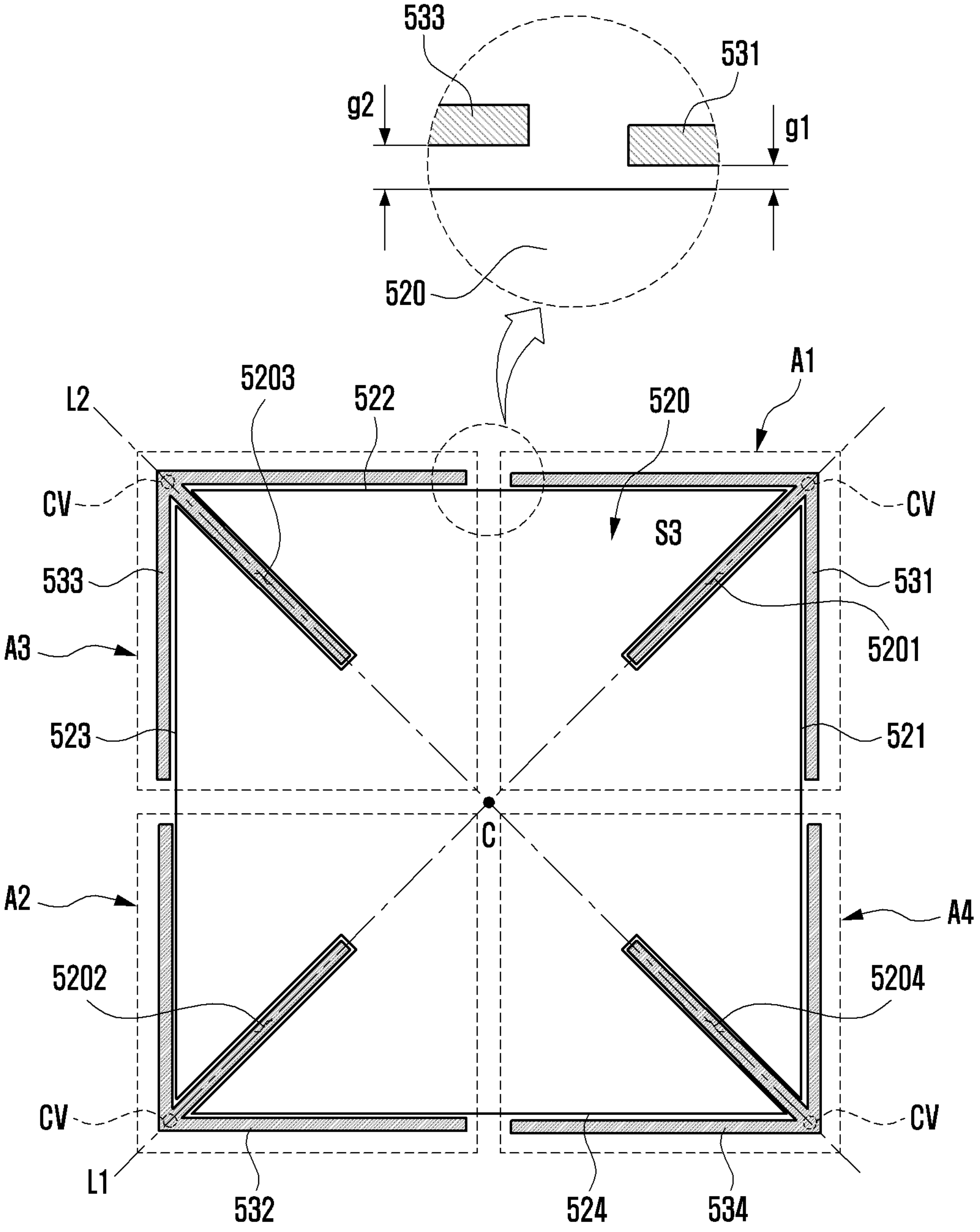
FIG. 10 is a plan view of a second conductive patch having an arrangement structure in which a first gap from the first conductive pad in a first region is less than a second gap from the third conductive pad in a third region according to one or more embodiments of the disclosure.

FIG. 10 is a plan view of the second conductive patch having an arrangement structure in which a first gap from the first conductive pad in the first region is less than a second gap from the third conductive pad in the third region, according to one or more embodiments of the disclosure.

In describing the second conductive patch 520 in FIG. 10 and plural conductive pads 531, 532, 533, 534 arranged thereabout, the same reference symbols are given to the same components as in FIG. 5C, and a detailed description thereof may be omitted.

With reference to FIG. 10, the antenna structure (e.g., antenna structure 501 in FIG. 5A) may include a plurality of conductive pads 531, 532, 533, 534 disposed along the edge of the second conductive patch 520. According to an embodiment, among the plural conductive pads 531, 532, 533, 534, the first gap g1 between the first conductive pad 531 and second conductive pad 532 and the second conductive patch 520 may be arranged to be less than the second gap g2 between the third conductive pad 533 and fourth conductive pad 534 and the second conductive patch 520. In this case, the amount of coupling between the first conductive pad 531 and second conductive pad 532 and the second conductive patch 520 may be set to be greater than the amount of coupling between the third conductive pad 533 and fourth conductive pad 534 and the second conductive patch 520.

Figure 11A:
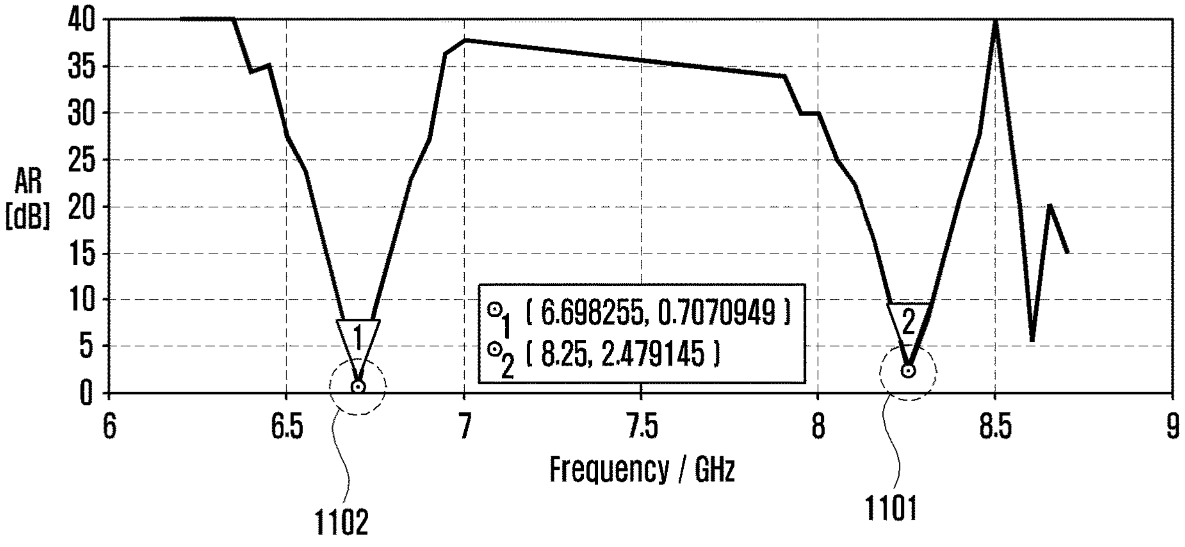
FIG. 11A is a graph showing AR characteristics of an antenna structure including a second conductive patch having the arrangement structure of FIG. 10 according to one or more embodiments of the disclosure.
Figure 11B:
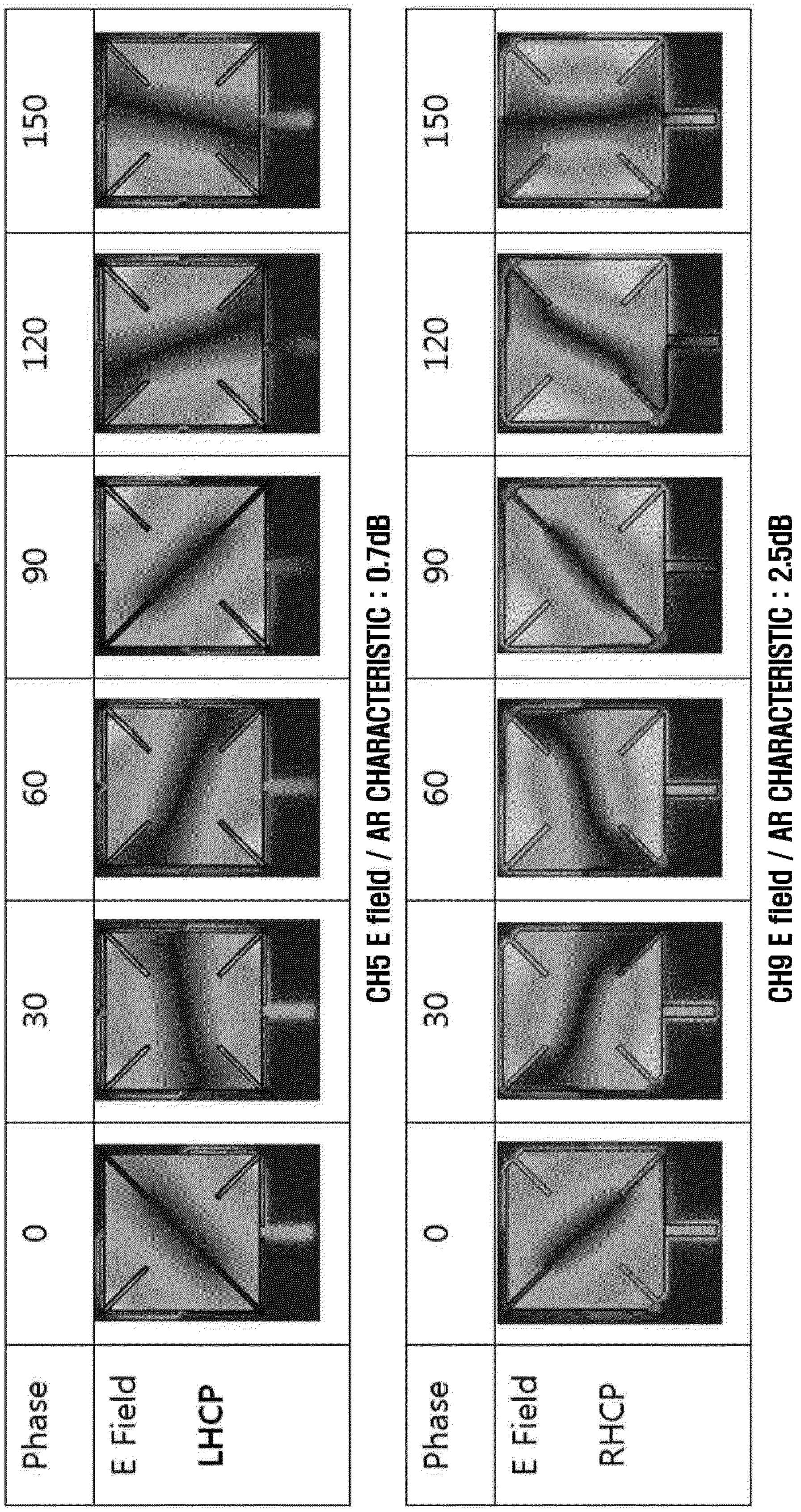
FIG. 11B is diagrams showing a change in electric field distribution according to a phase change in the antenna structure of FIG. 10 according to one or more embodiments of the disclosure.

FIG. 11A is a graph showing AR characteristics of an antenna structure including the second conductive patch having the arrangement structure of FIG. 10, according to one or more embodiments of the disclosure. FIG. 11B is diagrams showing a change in electric field distribution according to a phase change in the antenna structure of FIG. 10, according to one or more embodiments of the disclosure.

With reference to FIGS. 11A and 11B, it can be seen that, when the first gap g1 between the first conductive pad 531 and second conductive pad 532 and the second conductive patch 520 is set to be less than the second gap g2 between the third conductive pad 533 and fourth conductive pad 534 and the second conductive patch 520 as shown in FIG. 10, the antenna structure 501 operates as a dual-band circularly polarized antenna, where an AR characteristic of about 2.5 dB is exhibited in a first frequency band (e.g., CH9 (about 8.3 GHz band)) through the first conductive patch 510 (region 1101), and an AR characteristic of about 0.7 dB is exhibited in a second frequency band (e.g., CH5 (about 6.7 Ghz band)) lower than the first frequency through the second conductive patch 520 (region 1102). In this case, it can be seen that the AR characteristic of the second conductive patch operating in the second frequency band is improved closer to 0 dB compared to the case of FIGS. 7A and 7B or FIGS. 9A and 9B, which may mean that the second conductive patch forms a relatively circular polarization. According to an embodiment, it can be seen that in the first conductive patch 510 of the antenna structure 501, the movement of the electric field distribution along the phase change operates in RHCP; in the second conductive patch 520, the movement of the electric field distribution along the phase change operates in LHCP. Therefore, when the first conductive pad 531 and the second conductive pad 532 have a relatively close gap from the second conductive patch 520, as the second conductive patch 520 forms circular polarization in the opposite direction to that of the first conductive patch 510, interference between the two conductive patches 510 and 520 can be minimized.

Figure 12:
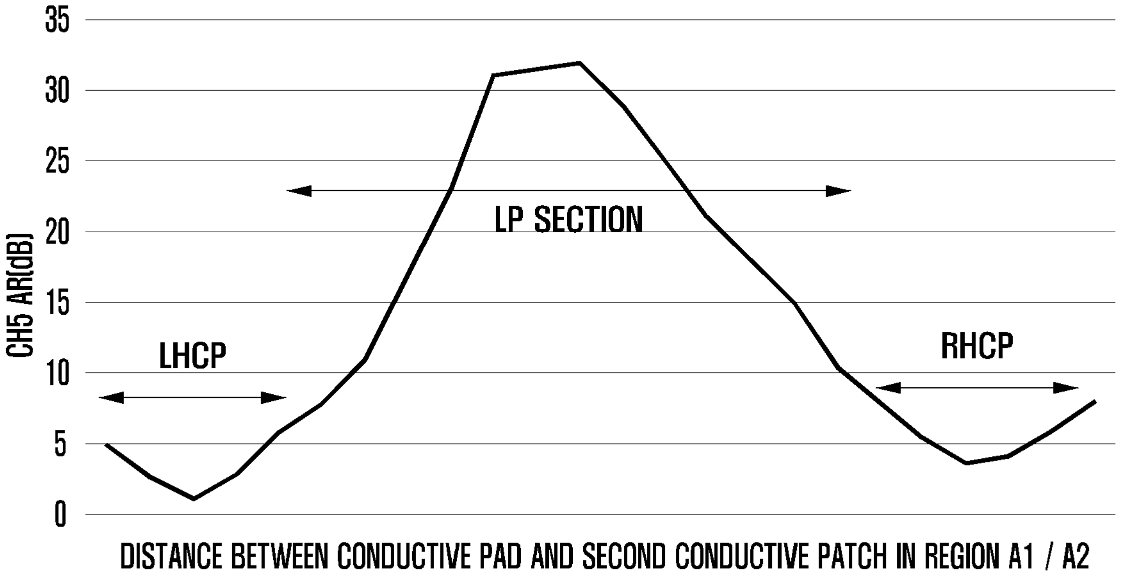
FIG. 12 is a graph showing polarization characteristics according to a change in the gap between the first conductive pad and the second conductive patch according to one or more embodiments of the disclosure.

FIG. 12 is a graph showing polarization characteristics according to a change in the gap between the first conductive pad and the second conductive patch according to various embodiments.

With reference to FIG. 12, it can be seen that the polarization characteristics of the second conductive patch 520 change according to a change in the first gap g1 between the first conductive pad 531 and second conductive pad 532 (disposed in the first region A1 and the second region A2 of the second conductive patch 520) and the second conductive patch 520. For example, in a state where in the third region A3 and fourth region A4, the second gap g2 between the third conductive pad 533 and fourth conductive pad 534 and the second conductive patch 520 is determined, it can be seen that the second conductive patch 520 may operate in RHCP when the first gap g1 becomes greater than the second gap g2, may pass through a linear polarization (LP) section as the first gap g1 becomes smaller, and may operate in LHCP in the opposite direction to the first conductive patch 510 when the first gap g1 becomes less than the second gap g2. This may mean that if the first gap g1 between the first conductive pad 531 and second conductive pad 532 and the second conductive patch 520 is properly adjusted, by having circular polarization characteristics in the opposite direction to the first conductive patch 510, mutual interference between the two conductive patches can be minimized and the radiation performance of the antenna structure 501 can be improved.

In an embodiment, the first conductive patch 510 can be operated in LHCP by forming cut portions in the third region A3 and fourth region A4. In this case, to minimize mutual interference between the two conductive patches 510 and 520, the first gap g1 may be greater than the second gap g2 (in the case of FIG. 8), such that the second conductive patch 520 may be set to operate in RHCP.

Figure 13:
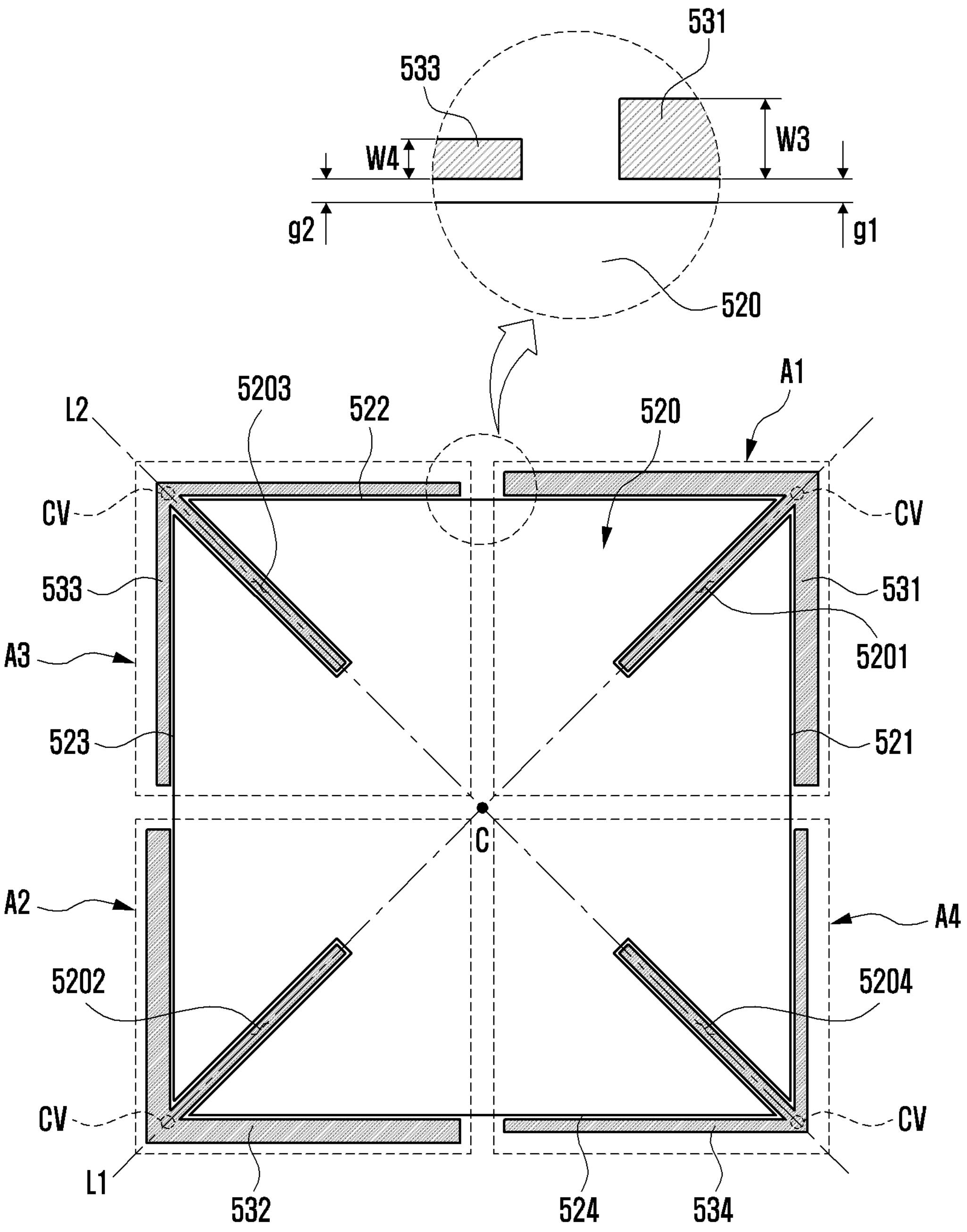
FIG. 13 is a plan view showing a second conductive patch having an arrangement structure in which a first width of the first conductive pad in a first region is greater than a second width of the third conductive pad in a third region according to one or more embodiments of the disclosure.

FIG. 13 is a plan view showing a second conductive patch having an arrangement structure in which a first width of the first conductive pad in the first region is greater than a second width of the third conductive pad in the third region according to one or more embodiments of the disclosure.

In describing the second conductive patch 520 in FIG. 10 and plural conductive pads 531, 532, 533, 534 arranged thereabout, the same reference symbols are given to the same components as in FIG. 5C, and a detailed description thereof may be omitted.

With reference to FIG. 13, the antenna structure (e.g., antenna structure 501 in FIG. 5A) may include a plurality of conductive pads 531, 532, 533, 534 disposed along the edge of the second conductive patch 520. According to an embodiment, among the plural conductive pads 531, 532, 533, 534, the first gap g1 between the first conductive pad 531 and second conductive pad 532 and the second conductive patch 520 may be equal to the second gap g2 between the third conductive pad 533 and fourth conductive pad 534 and the second conductive patch 520. According to an embodiment, a third width W3 of the first conductive pad 531 and the second conductive pad 532 may be greater than a fourth width W4 of the third conductive pad 533 and the fourth conductive pad 534.

Figure 14A:
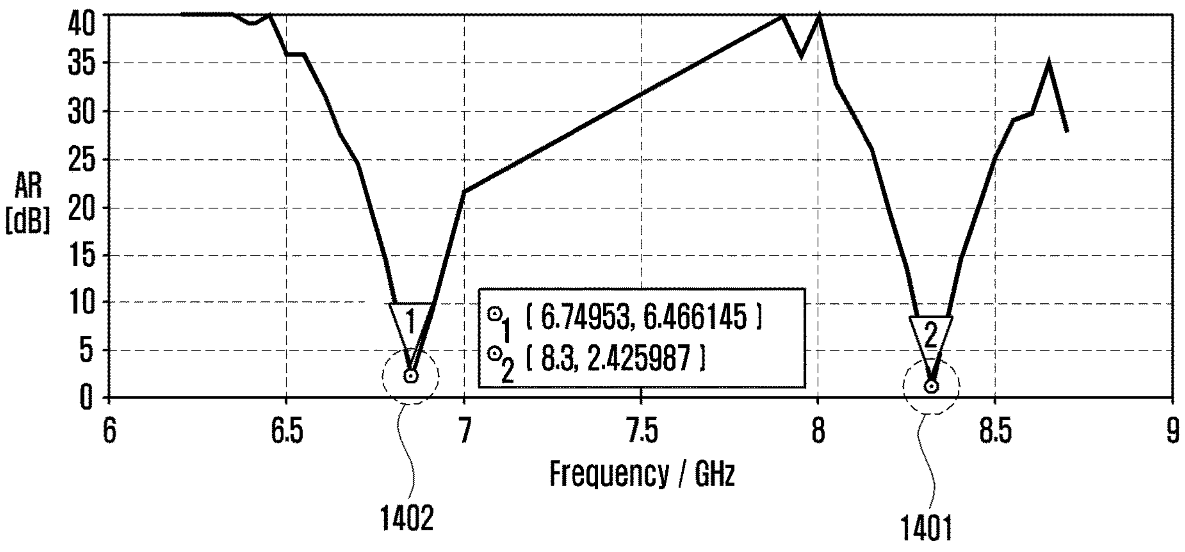
FIG. 14A is a graph showing AR characteristics of an antenna structure including a second conductive patch having the arrangement structure of FIG. 13 according to one or more embodiments of the disclosure.
Figure 14B:
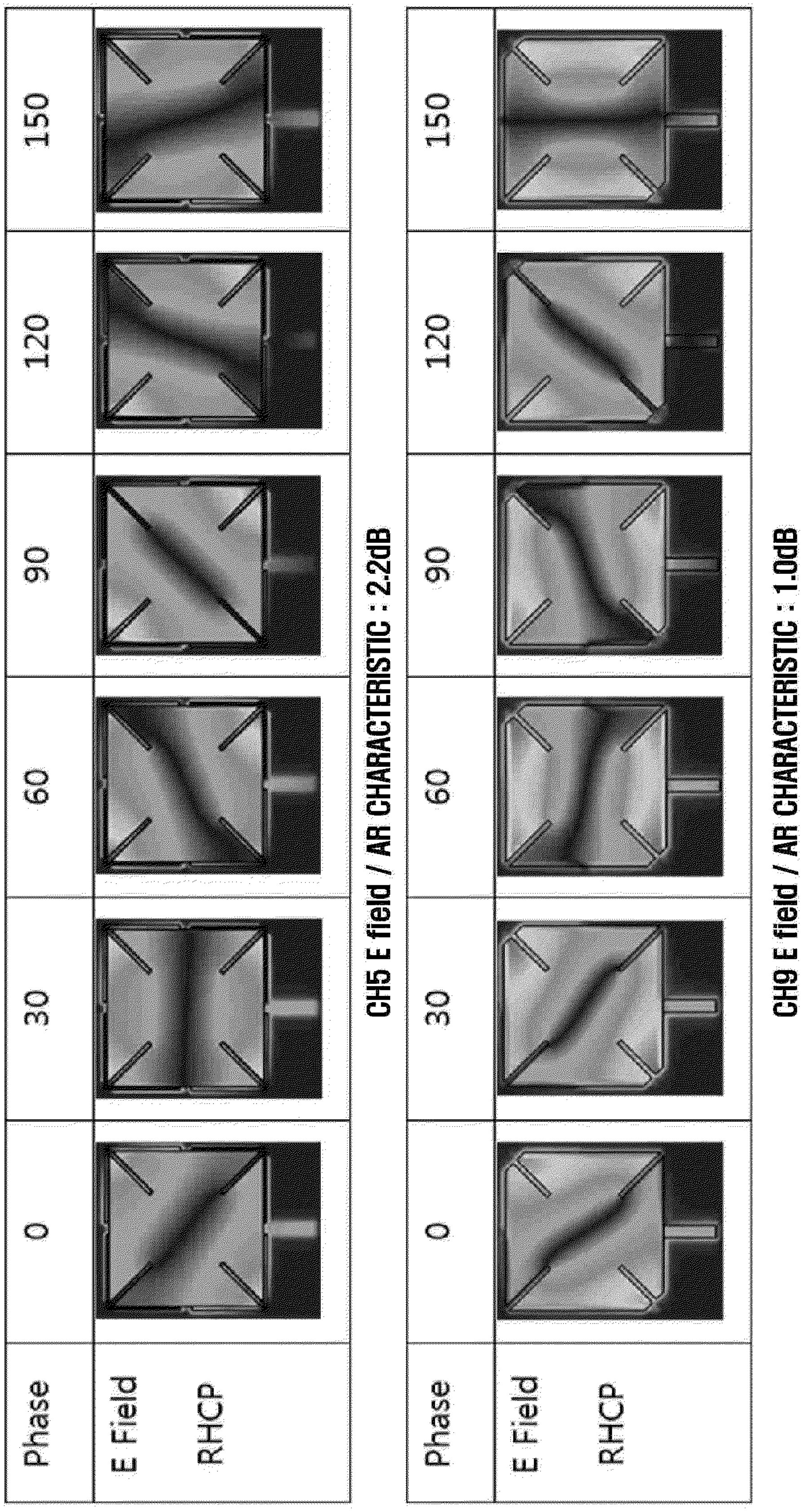
FIG. 14B is diagrams showing a change in electric field distribution according to a phase change in the antenna structure of FIG. 13 according to one or more embodiments of the disclosure.

FIG. 14A is a graph showing AR characteristics of an antenna structure including a second conductive patch having the arrangement structure of FIG. 13, according to one or more embodiments of the disclosure. FIG. 14B is diagrams showing a change in electric field distribution according to a phase change in the antenna structure of FIG. 13, according to one or more embodiments of the disclosure.

With reference to FIGS. 14A and 14B, it can be seen that, when the third width W3 of the first conductive pad 531 and second conductive pad 532 is greater than the fourth width W4 of the third conductive pad 533 and fourth conductive pad 534 as shown in FIG. 13, the antenna structure 501 operates as a dual-band circularly polarized antenna, where an AR characteristic of about 1.0 dB is exhibited in a first frequency band (e.g., CH9 (about 8.3 GHz band)) through the first conductive patch 510 (region 1401), and an AR characteristic of about 2.2 dB is exhibited in a second frequency band (e.g., CH5 (about 6.7 Ghz band)) lower than the first frequency through the second conductive patch 520 (region 1402). According to an embodiment, it can be seen that, in both the first conductive patch 510 and the second conductive patch 520 of the antenna structure 501, the movement of the electric field distribution along the phase change operates as in RHCP.

Figure 15:
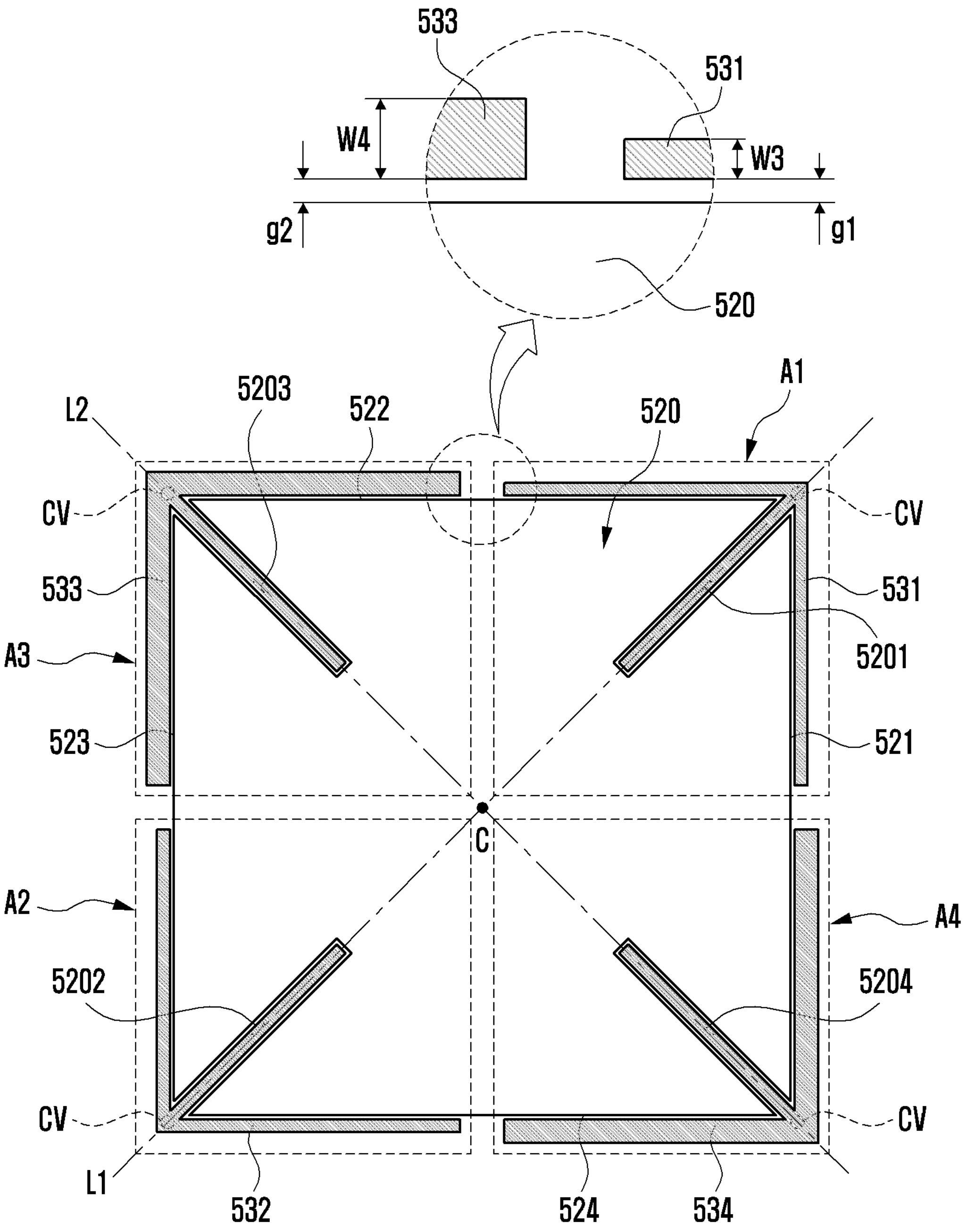
FIG. 15 is a plan view showing a second conductive patch having an arrangement structure in which a first width of the first conductive pad in a first region is less than a second width of the third conductive pad in a third region according to one or more embodiments of the disclosure.

FIG. 15 is a plan view showing the second conductive patch having an arrangement structure in which a first width of the first conductive pad in the first region is less than a second width of the third conductive pad in the third region, according to one or more embodiments of the disclosure.

In describing the second conductive patch 520 in FIG. 15 and plural conductive pads 531, 532, 533, 534 arranged thereabout, the same reference symbols are given to the same components as in FIG. 5C, and a detailed description thereof may be omitted.

With reference to FIG. 15, the antenna structure (e.g., antenna structure 501 in FIG. 5A) may include a plurality of conductive pads 531, 532, 533, 534 disposed along the edge of the second conductive patch 520. According to an embodiment, among the plural conductive pads 531, 532, 533, 534, the first gap g1 between the first conductive pad 531 and second conductive pad 532 and the second conductive patch 520 may be equal to the second gap g2 between the third conductive pad 533 and fourth conductive pad 534 and the second conductive patch 520. According to an embodiment, a third width W3 of the first conductive pad 531 and the second conductive pad 532 may be less than a fourth width W4 of the third conductive pad 533 and the fourth conductive pad 534.

Figure 16A:
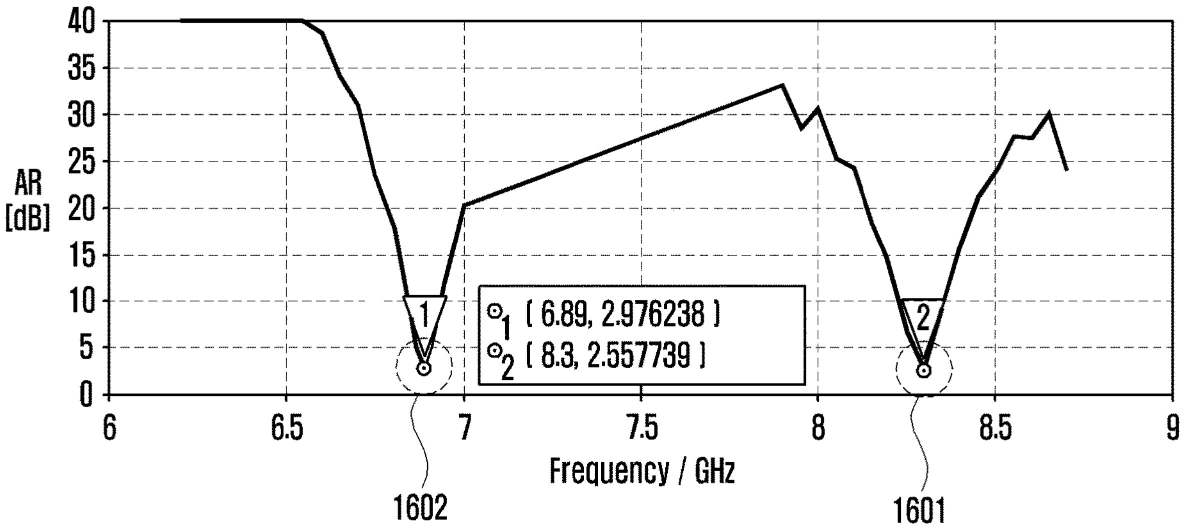
FIG. 16A is a graph showing AR characteristics of an antenna structure including a second conductive patch having the arrangement structure of FIG. 15 according to one or more embodiments of the disclosure.
Figure 16B:
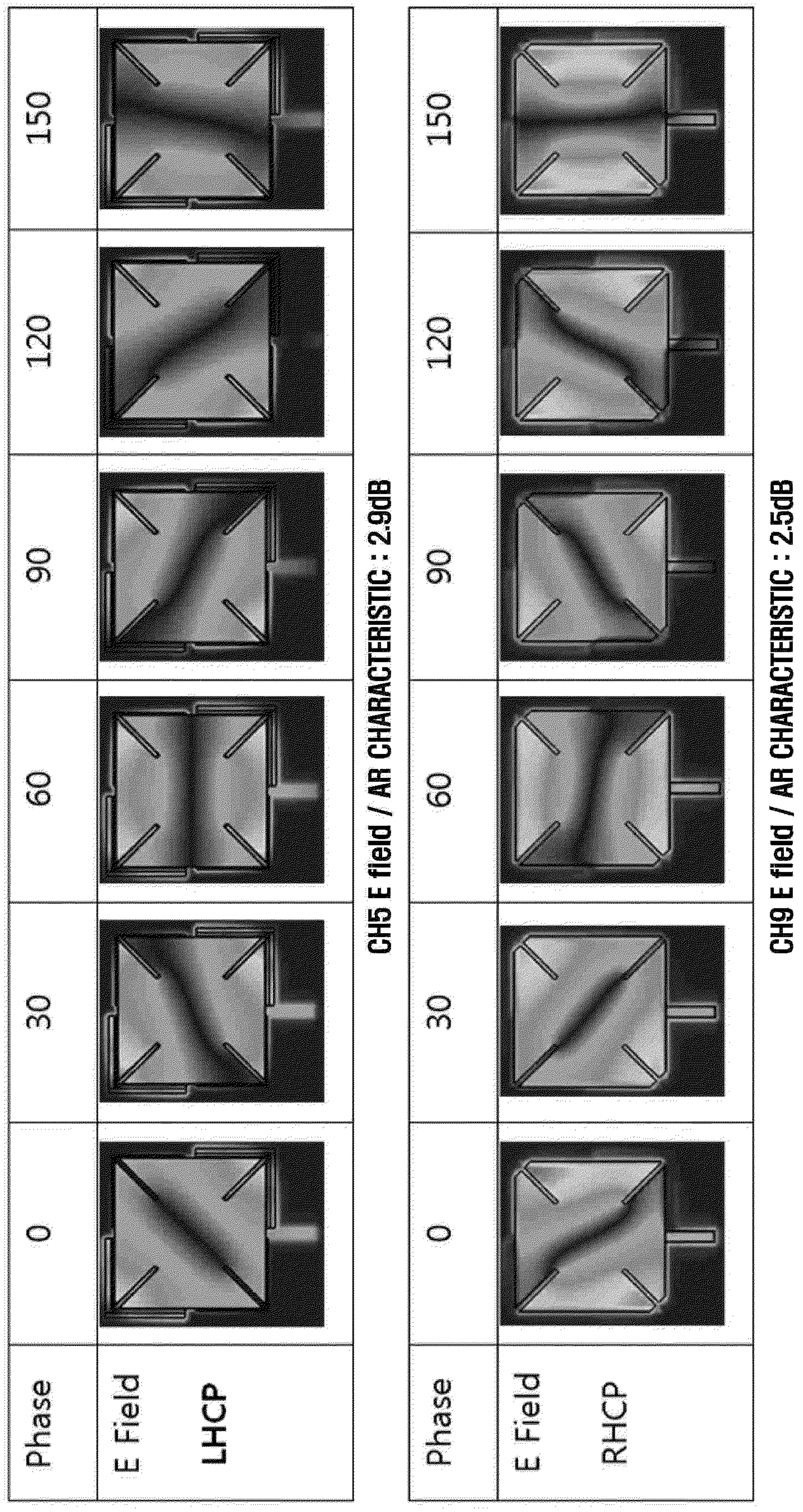
FIG. 16B is diagrams showing a change in electric field distribution according to a phase change in the antenna structure of FIG. 15 according to one or more embodiments of the disclosure.

FIG. 16A is a graph showing AR characteristics of an antenna structure including a second conductive patch having the arrangement structure of FIG. 15, according to one or more embodiments of the disclosure. FIG. 16B is diagrams showing a change in electric field distribution according to a phase change in the antenna structure of FIG. 15, according to one or more embodiments of the disclosure.

With reference to FIGS. 16A and 16B, it can be seen that, when the third width W3 of the first conductive pad 531 and second conductive pad 532 is less than the fourth width W4 of the third conductive pad 533 and fourth conductive pad 534 as shown in FIG. 15, the antenna structure 501 operates as a dual-band circularly polarized antenna, where an AR characteristic of about 2.5 dB is exhibited in a first frequency band (e.g., CH9 (about 8.3 GHz band)) through the first conductive patch 510 (region 1601), and an AR characteristic of about 2.9 dB is exhibited in a second frequency band (e.g., CH5 (about 6.7 Ghz band)) lower than the first frequency through the second conductive patch 520 (region 1602). According to an embodiment, it can be seen that, in the first conductive patch 510 of the antenna structure 501, the movement of the electric field distribution along the phase change operates in RHCP, and in the second conductive patch 520, the movement of the electric field distribution along the phase change operates in LHCP. Hence, when the third width W3 of the first conductive pad 531 and second conductive pad 532 is less than the fourth width W4 of the third conductive pad 533 and fourth conductive pad 534, as the second conductive patch 520 forms circular polarization in the opposite direction to that of the first conductive patch 510, interference between the two conductive patches 510 and 520 can be minimized. For instance, in the antenna structure, the polarization direction of the second conductive patch 520 may be determined according to a change in impedance value due to a change in relative widths of the conductive pads 531, 532, 533 and 534.

According to various embodiments, an electronic device (e.g., electronic device 200 in FIG. 2A or electronic device 300 in FIG. 3A) may include: a housing (e.g., electronic device 200 in FIG. 2A); an antenna module (e.g., antenna module 500 in FIG. 2A) disposed in the internal space of the housing, the antenna module including: a substrate (e.g., substrate 590 in FIG. 5A) that includes a first substrate surface (e.g., first substrate surface 5901 in FIG. 5A), a second substrate surface (e.g., second substrate surface 5902 in FIG. 5A) facing in a direction opposite to the first substrate surface, and a ground layer (e.g., ground layer G in FIG. 5A) disposed in the space between the first substrate surface and the second substrate surface; and a plurality of antenna structures (e.g., antenna structures 501, 502 and 503 in FIG. 4) arranged to be spaced apart from each other at specified intervals on the substrate, each of the plural antenna structures including: a rectangular first conductive patch (e.g., first conductive patch 510 in FIG. 5A) disposed between the ground layer and the first substrate surface and including a pair of cut portions (e.g., first cut portion 515, second cutting portion 516 in FIG. 5B) formed by cutting diagonally opposite corners; a rectangular second conductive patch (e.g., second conductive patch 520 in FIG. 5A) disposed between the first conductive patch and the ground layer to be coupled with the first conductive patch; and a plurality of conductive pads (e.g., conductive pads 531, 532, 533 and 534 in FIG. 5C) arranged to be spaced apart at specified intervals along the edge of the second conductive patch and electrically connected to the ground layer; and a wireless communication circuit (e.g., wireless communication module 192 in FIG. 1) arranged in the internal space to be electrically connected to the first conductive patch, wherein the wireless communication circuit may be configured to transmit and/or receive a radio signal of a first frequency band through the first conductive patch, and may be configured to receive a radio signal of a second frequency band different from the first frequency band through the second conductive patch.

According to various embodiments, the first conductive patch may include a first side, a second side extended perpendicularly from the first side, a third side extended perpendicularly from the second side, and a fourth side extended perpendicularly from the third side and connected to the first side; the pair of cut portions may include a first cut portion formed by cutting a first corner where the first side and the first side meet, and a second cut portion formed by cutting a second corner where the third side and the fourth side meet.

According to various embodiments, the second conductive patch may include a fifth side corresponding to the first side, a sixth side extended perpendicularly from the fifth side and corresponding to the second side, a seventh side extended perpendicularly from the sixth side and corresponding to the third side, and an eighth side extended perpendicularly from the seventh side, connected to the fifth side, and corresponding to the fourth side; the second conductive patch may be arranged to overlap the first conductive patch when the first substrate surface is viewed from above.

According to various embodiments, the second conductive patch may have substantially the same size and/or shape as the first conductive patch.

According to various embodiments, the first conductive patch may be electrically connected to the wireless communication circuit at a feeder extended from the fourth side or at a position adjacent to the fourth side.

According to various embodiments, the first conductive patch may include a first slit formed to have a specified first length and first width in a direction from the first cut portion where the first side and the second side meet toward the center, a second slit formed to have the first length and first width in a direction from the second cut portion where the third side and the fourth side meet toward the center, a third slit formed to have the first length and first width in a direction from a corner where the second side and the third side meet toward the center, and a fourth slit formed to have the first length and first width in a direction from a corner where the first side and the fourth side meet toward the center; the first frequency band may be determined according to the first length and/or the first width.

According to an embodiment, the second conductive patch may include a fifth slit formed to have a specified second length and second width in a direction from a corner where the fifth side and the sixth side meet toward a center, a sixth slit formed to have the second length and second width in a direction from a corner where the seventh side and the eighth side meet toward the center, a seventh slit formed to have the second length and second width in a direction from a corner where the second side and the third side meet toward the center, and an eighth slit formed to have the second length and the second width in a direction from a corner where the fifth side and the eighth side meet toward the center; the second frequency band may be determined according to the second length and/or the second width.

According to various embodiments, the first, second, third, and fourth slits may overlap respectively with the fifth, sixth, seventh, and eighth slits when the first substrate surface is viewed from above.

According to various embodiments, the first length and/or the first width may be substantially the same as the second length and/or the second width.

According to various embodiments, the plurality of conductive pads may include a first conductive pad disposed to have a specified first gap to be coupled with at least a portion of the fifth side and at least a portion of the sixth side, a second conductive pad disposed to have the first gap to be coupled with at least a portion of the seventh side and at least a portion of the eighth side, a third conductive pad disposed to have a specified second gap to be coupled with at least a portion of the sixth side and at least a portion of the seventh side, and a fourth conductive pad disposed to have the second gap to be coupled with at least a portion of the fifth side and at least a portion of the eighth side.

According to various embodiments, the first gap may be less than the second gap.

According to various embodiments, the first conductive pad and the second conductive pad may be disposed in a manner of being filled in at least a portion of the fifth slit and the sixth slit; the third conductive pad and the fourth conductive pad may be disposed in a manner of being filled in at least a portion of the seventh slit and the eighth slit.

According to various embodiments, the first, second, third, and fourth conductive pads may be disposed to have the same gap from the second conductive patch; the first conductive pad and the second conductive pad may be formed to have a third width, and the third conductive pad and the fourth conductive pad may be formed to have a fourth width greater than the third width.

According to various embodiments, the first conductive patch may be operated to have a first circular polarization rotating in a first direction, and the second conductive patch may be operated to have a second circular polarization rotating in a second direction opposite to the first direction.

According to various embodiments, the wireless communication circuit may be configured to receive a radio signal of a frequency band ranging from 3.735 GHz to 10.2 GHz through the first conductive patch and/or the second conductive patch.

According to various embodiments, the plurality of antenna structures may include a first antenna structure, a second antenna architecture arranged to have a specified separation distance from the first antenna structure along a first axis, and a third antenna structure arranged to have a specified separation distance from the first antenna structure along a second axis that passes through the first antenna structure and is not parallel to the first axis.

According to various embodiments, the first axis and the second axis may be substantially perpendicular to each other.

According to various embodiments, an electronic device (e.g., electronic device 200 in FIG. 2A or electronic device 300 in FIG. 3A) may include: a housing (e.g., electronic device 200 in FIG. 2A); an antenna module, as an antenna structure (e.g., antenna structure 501 in FIG. 5A) disposed in the internal space of the housing, the antenna module including: a substrate (e.g., substrate 590 in FIG. 5A) that includes a first substrate surface (e.g., first substrate surface 5901 in FIG. 5A), a second substrate surface (e.g., second substrate surface 5902 in FIG. 5A) facing in a direction opposite to the first substrate surface, and a ground layer (e.g., ground layer G in FIG. 5A) disposed in the space between the first substrate surface and the second substrate surface; and a plurality of antenna structures (e.g., antenna structures 501, 502 and 503 in FIG. 4) arranged to be spaced apart from each other at specified intervals on the substrate, each of the plural antenna structures including: a rectangular first conductive patch (e.g., first conductive patch 510 in FIG. 5A) disposed between the ground layer and the first substrate surface and including a pair of cut portions (e.g., first cut portion 515, second cutting portion 516 in FIG. 5B) formed by cutting diagonally opposite corners; a rectangular second conductive patch (e.g., second conductive patch 520 in FIG. 5A) disposed between the first conductive patch and the ground layer to be coupled with the first conductive patch; and a plurality of conductive pads (e.g., conductive pads 531, 532, 533 and 534 in FIG. 5C) arranged to be spaced apart at specified intervals along the edge of the second conductive patch and electrically connected to the ground layer; and a wireless communication circuit (e.g., wireless communication module 192 in FIG. 1) arranged in the internal space to be electrically connected to the first conductive patch, wherein the wireless communication circuit may be configured to transmit and/or receive a radio signal of a first frequency band through the first conductive patch, and may be configured to receive a radio signal of a second frequency band different from the first frequency band through the second conductive patch.

According to various embodiments, the first conductive patch may include a first side, a second side extended perpendicularly from the first side, a third side extended perpendicularly from the second side, and a fourth side extended perpendicularly from the third side and connected to the first side; the second conductive patch may include a fifth side corresponding to the first side, a sixth side extended perpendicularly from the fifth side and corresponding to the second side, a seventh side extended perpendicularly from the sixth side and corresponding to the third side, and an eighth side extended perpendicularly from the seventh side, connected to the fifth side, and corresponding to the fourth side; the pair of cut portions may include a first cut portion formed by cutting a first corner where the first side and the first side meet, and a second cut portion formed by cutting a second corner where the third side and the fourth side meet; the second conductive patch may be arranged to overlap the first conductive patch when the first substrate surface is viewed from above.

According to various embodiments, the plurality of conductive pads may include a first conductive pad disposed to have a specified first gap to be coupled with at least a portion of the fifth side and at least a portion of the sixth side, a second conductive pad disposed to have the first gap to be coupled with at least a portion of the seventh side and at least a portion of the eighth side, a third conductive pad disposed to have a specified second gap to be coupled with at least a portion of the sixth side and at least a portion of the seventh side, and a fourth conductive pad disposed to have the second gap to be coupled with at least a portion of the fifth side and at least a portion of the eighth side; the first gap may be less than the second gap.

In addition, the embodiments of the disclosure disclosed in this specification and drawings are only provided as specific examples to easily explain the technical content according to the embodiments of the disclosure and to facilitate understanding of the embodiments of the disclosure, and are not intended to limit the scope of the embodiments of the disclosure. Therefore, the scope of the various embodiments of the disclosure should be interpreted as including both those embodiments disclosed herein and all changes or modified forms derived based on technical ideas of the embodiments of the disclosure.

In an antenna (e.g., antenna module) according to one or more embodiments of the disclosure, a circular polarization antenna operating orthogonally to the first conductive patch in a designated frequency band is implemented with only the arrangement structure of conductive pads disposed on the same layer as the second conductive patch, which can make the electronic device slimmer and can improve radiation performance by minimizing interference with the first conductive patch.

In addition, various effects may be provided that can be directly or indirectly identified through this disclosure.

The above-described embodiments are merely specific examples to describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. An electronic device comprising:

a housing;

an antenna module disposed in an internal space of the housing, the antenna module comprising:

a substrate comprising a first substrate surface, a second substrate surface facing in a direction opposite to the first substrate surface, and a ground layer between the first substrate surface and the second substrate surface; and a plurality of antenna structures spaced apart from each other on the substrate, each antenna structure of the plurality of antenna structures comprising:

a first conductive patch between the ground layer and the first substrate surface, having a rectangular shape, and comprising a first cut portion and a second cut portion at diagonally opposite corners;

a second conductive patch between the first conductive patch and the ground layer, having a rectangular shape, and coupled to the first conductive patch; and a plurality of conductive pads spaced apart from each other along an edge of the second conductive patch, and electrically connected to the ground layer; and a wireless communication circuit provided in the internal space and electrically connected to the first conductive patch, wherein the wireless communication circuit is configured to transmit or receive a radio signal of a first frequency band through the first conductive patch, and receive a radio signal of a second frequency band, different from the first frequency band, through the second conductive patch, wherein the plurality of conductive pads are disposed on a same layer of the substrate as the second conductive patch and spaced apart at specific intervals from the second conductive patch, and wherein the plurality of conductive pads are electrically coupled to the second conductive patch.

2. The electronic device of claim 1, wherein the first conductive patch further comprises a first side, a second side extended perpendicularly from the first side, a third side extended perpendicularly from the second side, and a fourth side extended perpendicularly from the third side and connected to the first side, and wherein the first cut portion is at a first corner where the first side and the second side meet, and the second cut portion is at a second corner where the third side and the fourth side meet.

3. The electronic device of claim 2, wherein the second conductive patch comprises a fifth side corresponding to the first side, a sixth side extended perpendicularly from the fifth side and corresponding to the second side, a seventh side extended perpendicularly from the sixth side and corresponding to the third side, and an eighth side extended perpendicularly from the seventh side, connected to the fifth side, and corresponding to the fourth side, and wherein the second conductive patch overlaps the first conductive patch when the first substrate surface is viewed from above.

4. The electronic device of claim 3, wherein the second conductive patch has at least one of a substantially same size or a substantially same shape as the first conductive patch.

5. The electronic device of claim 3, wherein the first conductive patch further comprises a feeder extending from the fourth side or at a position adjacent to the fourth side, and electrically connected to the wireless communication circuit.

6. The electronic device of claim 3, wherein the first conductive patch further comprises a first slit extending from the first cut portion toward a center of the first conductive patch, a second slit extending from the second cut portion toward the center of the first conductive patch, a third slit extending from a corner where the second side and the third side meet toward the center of the first conductive patch, and a fourth slit extending from a corner where the first side and the fourth side meet toward the center of the first conductive patch, wherein each of the first slit, the second slit, the third slit, and the fourth slit has a first length and a first width, and wherein the first frequency band is determined according to at least one of the first length or the first width.

7. The electronic device of claim 6, wherein the second conductive patch further comprises a fifth slit extending from a corner where the fifth side and the sixth side meet toward a center of the second conductive patch, a sixth slit extending from a corner where the seventh side and the eighth side meet toward the center of the second conductive patch, a seventh slit extending from a corner where the second side and the third side meet toward the center of the second conductive patch, and an eighth slit extending from a corner where the fifth side and the eighth side meet toward the center of the second conductive patch, wherein each of the fifth slit, the sixth slit, the seventh slit, and the eighth slit has a second length and a second width, and wherein the second frequency band is determined according to at least one of the second length or the second width.

8. The electronic device of claim 7, wherein the first slit, the second slit, the third slit, and the fourth slit respectively overlap the fifth slit, the sixth slit, the seventh slit, and the eighth slit when the first substrate surface is viewed from above.

9. The electronic device of claim 8, wherein the first length is substantially equal to the second length, or the first width is substantially equal to the second width.

10. The electronic device of claim 7, wherein the plurality of conductive pads comprises:

a first conductive pad electrically coupled with and separated by a first gap from at least a portion of the fifth side and at least a portion of the sixth side;

a second conductive pad electrically coupled with and separated by the first gap from at least a portion of the seventh side and at least a portion of the eighth side;

a third conductive pad electrically coupled with and separated by a second gap from at least a portion of the sixth side and at least a portion of the seventh side; and a fourth conductive pad electrically coupled with and separated by the second gap from at least a portion of the fifth side and at least a portion of the eighth side.

11. The electronic device of claim 10, wherein a size of the first gap is less than a size of the second gap.

12. The electronic device of claim 10, wherein the first conductive pad and the second conductive pad are disposed in at least a portion of the fifth slit and the sixth slit, respectively, and wherein the third conductive pad and the fourth conductive pad are disposed in at least a portion of the seventh slit and the eighth slit, respectively.

13. The electronic device of claim 10, wherein a size of the first gap is substantially the same as a size of the second gap, wherein each of the first conductive pad and the second conductive pad has a third width, and wherein each of the third conductive pad and the fourth conductive pad has a fourth width that is greater than the third width.

14. The electronic device of claim 1, wherein the first conductive patch has a first circular polarization rotating in a first direction, and wherein the second conductive patch has a second circular polarization rotating in a second direction opposite to the first direction.

15. The electronic device of claim 1, wherein the wireless communication circuit is further configured to receive a radio signal of a frequency band ranging from 3.735 GHz to 10.2 GHz through at least one of the first conductive patch or the second conductive patch.

16. The electronic device of claim 1, wherein the plurality of antenna structures comprises a first antenna structure, a second antenna structure arranged to have a specified separation distance from the first antenna structure along a first axis, and a third antenna structure arranged to have a specified separation distance from the first antenna structure along a second axis that passes through the first antenna structure and is not parallel to the first axis.

17. The electronic device of claim 16, wherein the first axis and the second axis are substantially perpendicular to each other.

18. An electronic device comprising:

a housing;

an antenna structure disposed in an internal space of the housing, the antenna structure comprising:

a substrate including a first substrate surface, a second substrate surface facing in a direction opposite to the first substrate surface, and a ground layer disposed between the first substrate surface and the second substrate surface;

a first conductive patch disposed between the ground layer and the first substrate surface and including a pair of cut portions formed by cutting diagonally opposite corners;

a second conductive patch disposed between the first conductive patch and the ground layer to be coupled with the first conductive patch; and a plurality of conductive pads spaced apart from each other at specified intervals along an edge of the second conductive patch and electrically connected to the ground layer; and a wireless communication circuit arranged in the internal space to be electrically connected to the first conductive patch, wherein the wireless communication circuit is configured to:

transmit or receive a signal of a first frequency band through the first conductive patch, and receive a signal of a second frequency band different from the first frequency band through the second conductive patch, wherein the plurality of conductive pads are disposed on a same layer of the substrate as the second conductive patch and spaced apart at specific intervals from the second conductive patch, and wherein the plurality of conductive pads are electrically coupled to the second conductive patch.

19. The electronic device of claim 18, wherein the first conductive patch comprises a first side, a second side extended perpendicularly from the first side, a third side extended perpendicularly from the second side, and a fourth side extended perpendicularly from the third side and connected to the first side, wherein the second conductive patch comprises a fifth side corresponding to the first side, a sixth side extended perpendicularly from the fifth side and corresponding to the second side, a seventh side extended perpendicularly from the sixth side and corresponding to the third side, and an eighth side extended perpendicularly from the seventh side, connected to the fifth side, and corresponding to the fourth side, wherein the pair of cut portions comprises a first cut portion formed by cutting a first corner where the first side and the second side meet, and a second cut portion formed by cutting a second corner where the third side and the fourth side meet, and wherein the second conductive patch overlaps the first conductive patch when the first substrate surface is viewed from above.

20. The electronic device of claim 19, wherein the plurality of conductive pads comprises a first conductive pad disposed to have a specified first gap to be coupled with at least a portion of the fifth side and at least a portion of the sixth side, a second conductive pad disposed to have the first gap to be coupled with at least a portion of the seventh side and at least a portion of the eighth side, a third conductive pad disposed to have a specified second gap to be coupled with at least a portion of the sixth side and at least a portion of the seventh side, and a fourth conductive pad disposed to have the second gap to be coupled with at least a portion of the fifth side and at least a portion of the eighth side, and wherein the first gap is less than the second gap.

* * * * *